US012707263B2

(12) United States Patent
Tiwari et al.

(10) Patent No.: US 12,707,263 B2
(45) Date of Patent: Aug. 11, 2026

(54) METHOD OF USER EQUIPMENT RELATED TO AUTHENTICATION AND KEY AGREEMENT PROCEDURE, AND USER EQUIPMENT

(71) Applicant: NEC Corporation, Tokyo (JP)

(72) Inventors: Kundan Tiwari, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 254 days.

(21) Appl. No.: 18/030,952

(22) PCT Filed: Oct. 12, 2021

(86) PCT No.: PCT/JP2021/037796
§ 371 (c)(1),
(2) Date: Apr. 7, 2023

(87) PCT Pub. No.: WO2022/080388
PCT Pub. Date: Apr. 21, 2022

(65) Prior Publication Data

US 2023/0379707 A1 Nov. 23, 2023

(30) Foreign Application Priority Data

Oct. 16, 2020 (IN) ............................. 202011045155

(51) Int. Cl.

| | |
|---|---|
| ***H04W 12/062*** | (2021.01) |
| ***H04W 8/02*** | (2009.01) |
| ***H04W 12/0431*** | (2021.01) |
| *H04W 12/06* | (2021.01) |

(52) U.S. Cl.
CPC ........... *H04W 12/062* (2021.01); *H04W 8/02* (2013.01); *H04W 12/0431* (2021.01)

(58) Field of Classification Search
CPC ..... H04W 12/06; H04W 12/062; H04W 8/02; H04W 12/0431
See application file for complete search history.

(56) References Cited

U.S. PATENT DOCUMENTS

2019/0223063 A1* 7/2019 Palanigounder ...... H04W 12/04
2020/0344606 A1* 10/2020 Zaus ....................... H04W 8/18
2021/0144548 A1* 5/2021 Ben Henda ....... H04W 12/0433

FOREIGN PATENT DOCUMENTS

WO 2020/179665 A1 9/2020
WO 2020/208996 A1 10/2020
WO WO-2020201051 A1 * 10/2020

OTHER PUBLICATIONS

International Search Report for PCT Application No. PCT/JP2021/037796, mailed on Jan. 18, 2022.
Written opinion for PCT Application No. PCT/JP2021/037796, mailed on Jan. 18, 2022.

(Continued)

*Primary Examiner* — Jinsong Hu
*Assistant Examiner* — Farideh Madani
(74) *Attorney, Agent, or Firm* — Sughrue Mion, PLLC

(57) ABSTRACT

A procedure to establish latest security key in a UE and a network is disclosed. More specifically, the procedure defines various method to establish latest Kausf in the UE and the network and make the UE and network uses the same Kausf in various security procedure.

10 Claims, 16 Drawing Sheets

(56) References Cited

OTHER PUBLICATIONS

3GPP TR 21.905: "Vocabulary for 3GPP Specifications". V16.0.0 (Jun. 2019).
3GPP TS 23.501: "System architecture for the 5G System (5GS)". V16.6.0 (Sep. 2020).
3GPP TS 23.502: "Procedures for the 5G System (5GS)", V16.6.0 (Sep. 2020).
3GPP TS 24.501: "Non-Access-Stratum (NAS) protocol for 5G System (5GS); Stage 3". V16.6.0 (Sep. 2020).
3GPP TS 33.501: "Security architecture and procedures for 5G system" V16.4.0 (Sep. 2020).
3GPP TS 33.102: "3G Security; Security architecture" V16.0.0 (Jul. 2020).
JP Office Action for JP Application No. 2023-522867, mailed on Apr. 1, 2025 with English Translation.
Draft LS reply to CT4 LS on Multiple Kausf upon registering via multiple SNs, 3GPP TSGSA3 Meeting #99e S3-201350, May 15, 2020.
CN Office Action for CN Application No. 202180070606.0, mailed on Jun. 25, 2025 with English Translation.
Huawei, HiSilicon, "Storage of 5GMM information; SOR counter and a UE parameter update counter", 3GPP TSG-CT6 Meeting #96 C6-190334, Oct. 1, 2019.
Indian Official Communication for IN Appiication No. 202317027193, mailed on May 22, 2026.

* cited by examiner

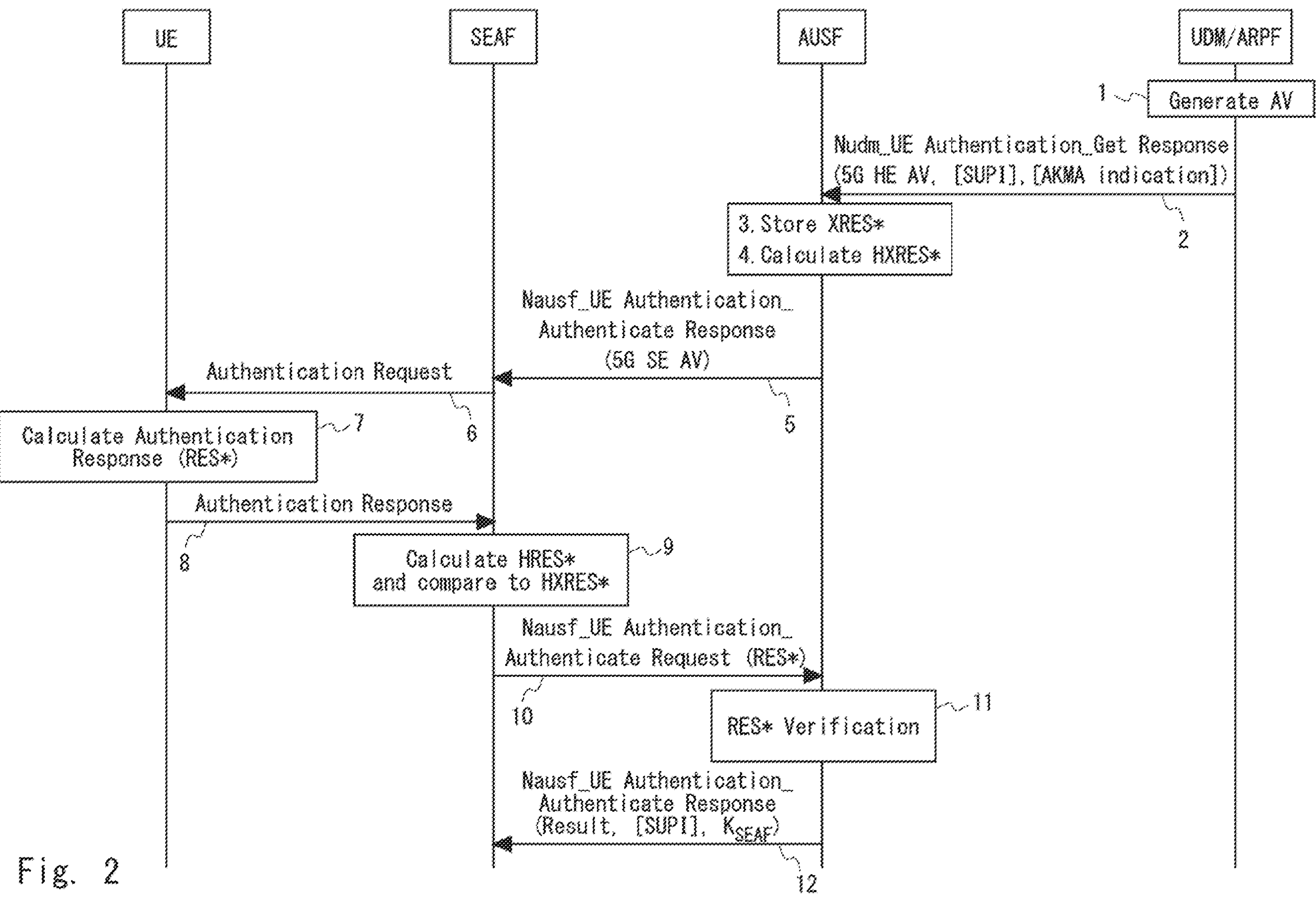
UE
SEAF
AUSF
UDM/ARPF
1
Generate AV
Nudm_UE Authentication_Get Response
(5G HE AV, [SUPI], [AKMA indication])
2
3. Store XRES*
4. Calculate HXRES*
Nausf_UE Authentication_
Authenticate Response
(5G SE AV)
5
Authentication Request
6
Calculate Authentication
Response (RES*)
7
Authentication Response
8
Calculate HRES*
and compare to HXRES*
9
Nausf_UE Authentication_
Authenticate Request (RES*)
10
RES* Verification
11
Nausf_UE Authentication_
Authenticate Response
(Result, [SUPI], $K_{SEAF}$)
12
Fig. 2

Figure 6.1.2-1: Initiation of authentication procedure and selection of authentication method Figure 6.1.3.2-1: Authentication procedure for 5G AKA Figure 5.4.1.3.7.1:
Authentication failure during 5G AKA based primary authentication and key agreement procedure

METHOD OF USER EQUIPMENT RELATED TO AUTHENTICATION AND KEY AGREEMENT PROCEDURE, AND USER EQUIPMENT

This application is a National Stage Entry of PCT/JP2021/037796 filed on Oct. 12, 2021, which claims priority from Indian Patent Application number 202011045155 filed on Oct. 16, 2020, the contents of all of which are incorporated herein by reference, in their entirety.

TECHNICAL FIELD

The present disclosure relates generally to wireless telecommunications, and, in particular embodiments, relates to handling of security keys during authentication procedure.

BACKGROUND ART

The purpose of the primary authentication and key agreement procedure is to enable mutual authentication between the UE and the network and to provide keying material that can be used between the UE and network in subsequent security procedures, as specified in NPL 5. The keys $K_{AUSF}$, $K_{SEAF}$ and $K_{AMF}$ are generated after successful authentication procedure.

Two methods of primary authentication and key agreement procedure are defined:

a) EAP based primary authentication and key agreement procedure.

b) 5G AKA based primary authentication and key agreement procedure.

The UE and the AMF shall support both the EAP based primary authentication and key agreement procedure and the 5G AKA based primary authentication and key agreement procedure. When the authentication procedure fails in the network, then the AMF returns Authentication Reject message to the UE.

FIG. 1 illustrates the initiation of authentication procedure and selection of authentication method initiation of authentication procedure and selection of authentication method. The authentication method that to be applied to the UE is selected by the UDM.

FIG. 2 illustrates the 5G AKA based primary authentication and key agreement procedure.

The $K_{AUSF}$ (Kausf) created in the UE and AUSF is used for a security mechanism in the Steering of roaming (SoR) procedure and UE parameters update via UDM control plane procedure security mechanism as specified in NPL 5.

FIG. 3 illustrates the procedure for steering of UE in VPLMN (Visited Public land mobile network) during registration.

In the Steering of roaming procedure, Kausf is used to derive SoR-MAC-Iausf in the UE and AUSF. When the UE receives a SOR-MAC-Iausf from the network, the UE calculates a SoR-MAC-Iasuf and compares with the SOR-MAC-Iausf that is received from the network. If the SOR-MAC-Iausfs are matched in the UE, then the UE determines that the security check of SoR transmission is passed and the UE stores the steering list, I.E. list of preferred PLMN/access technology combinations in the UE.

FIG. 4 illustrates the procedure for providing list of preferred PLMN/access technology combinations after registration.

In the UE parameters update via UDM control plane procedure, when the UE receives a UPU-MAC-Iausf from the network, the UE calculates a UPU-MAC-Iausf and compares with the UPU-MAC-Iausf that is received from the network. If the UPU-MAC-Iausfs are matched in the UE, then the UE determines that the UE parameter transmission by the UE parameters update via UDM control plane procedure is secured and stores the UE parameters that is sent by the UDM in the UE.

In addition, the Kasuf is also used to generate AKMA (Authentication and Key Agreement for Applications) key. In case when the UE is registered to two different PLMNs (for example, one via 3GPP access and another one via a non-3GPP access), the UE and the AUSF will store only the latest Kausf. This latest Kausf is used in various security procedures in the UE and the network.

CITATION LIST

Non Patent Literature

NPL 1: 3GPP TR 21.905: "Vocabulary for 3GPP Specifications". V16.0.0 (2019 June)

NPL 2: 3GPP TS 23.501: "System architecture for the 5G System (5GS)". V16.6.0 (2020 September)

NPL 3: 3GPP TS 23.502: "Procedures for the 5G System (5G"S)". V16.6.0 (2020 September)

NPL 4: 3GPP TS 24.501: "Non-Access-Stratum (NAS) protocol for 5G System (5GS); Stage 3". V16.6.0 (2020 September)

NPL 5: 3GPP TS 33.501: "Security architecture and procedures for 5G system" V16.4.0 (2020 September)

NPL 6: 3GPP TS 33.102: "3G Security; Security architecture" V16.0.0 (2020 July)

SUMMARY OF INVENTION

Technical Problem

The authentication and key agreement procedures defined in NPL 5 remains ambiguous. As stated in the background, synchronizing Kausf information between the UE and the network is very important for the 5GS as the Kausf information is used by various security procedures. If Kausf were miss-synchronized between the UE and the network, the 5GS should not provide any services over the 5GS as the security is very important and thus no compromised.

Solution to Problem

In a first aspect of the present disclosure, a method of a User Equipment (UE) comprises receiving, from an Access and Mobility Management Function (AMF), a message in a case where 5G Authentication and Key Agreement (AKA) based primary authentication and key agreement procedure is successful; deleting first $K_{AUSF}$ in a case where the UE receives the message; considering second $K_{AUSF}$ to be valid $K_{AUSF}$ in a case where the UE receives the message; and resetting a counter to zero in a case where the UE receives the message.

In a second aspect of the present disclosure, a User Equipment (UE) comprises means for receiving, from an Access and Mobility Management Function (AMF), a message in a case where 5G Authentication and Key Agreement (AKA) based primary authentication and key agreement procedure is successful; means for deleting first $K_{AUSF}$ in a case where the means for receiving receives the message; means for considering second $K_{AUSF}$ to be valid $K_{AUSF}$ in a case where the means for receiving receives the message;

and means for resetting a counter to zero in a case where the means for receiving receives the message.

BRIEF DESCRIPTION OF DRAWINGS

FIG. 2 is a conventional signaling diagram illustrating authentication procedure for 5G AKA.

DESCRIPTION OF EMBODIMENTS

Figure 1:
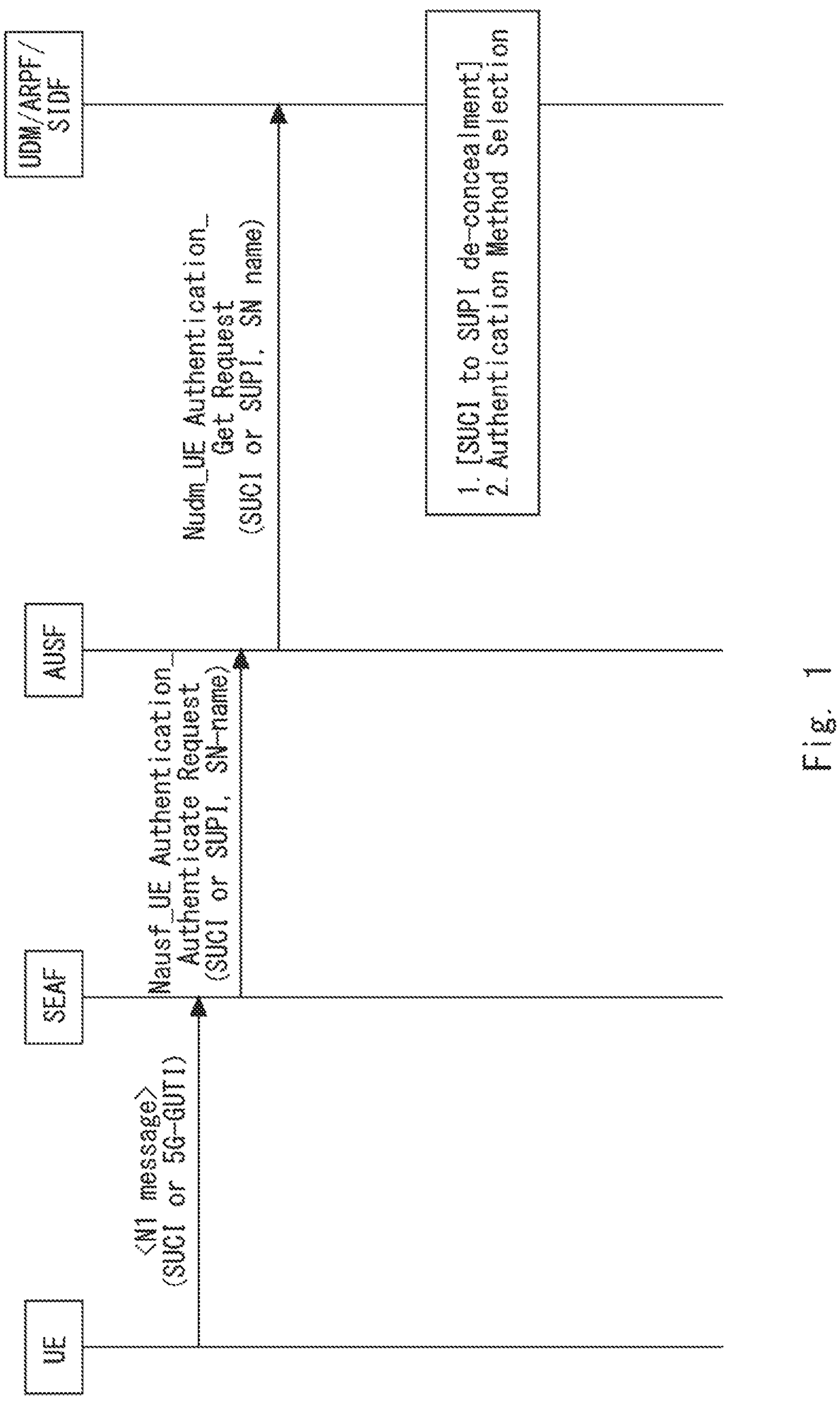
FIG. 1 is a conventional signaling diagram illustrating initiation of authentication procedure and selection of authentication method.
Figure 3:
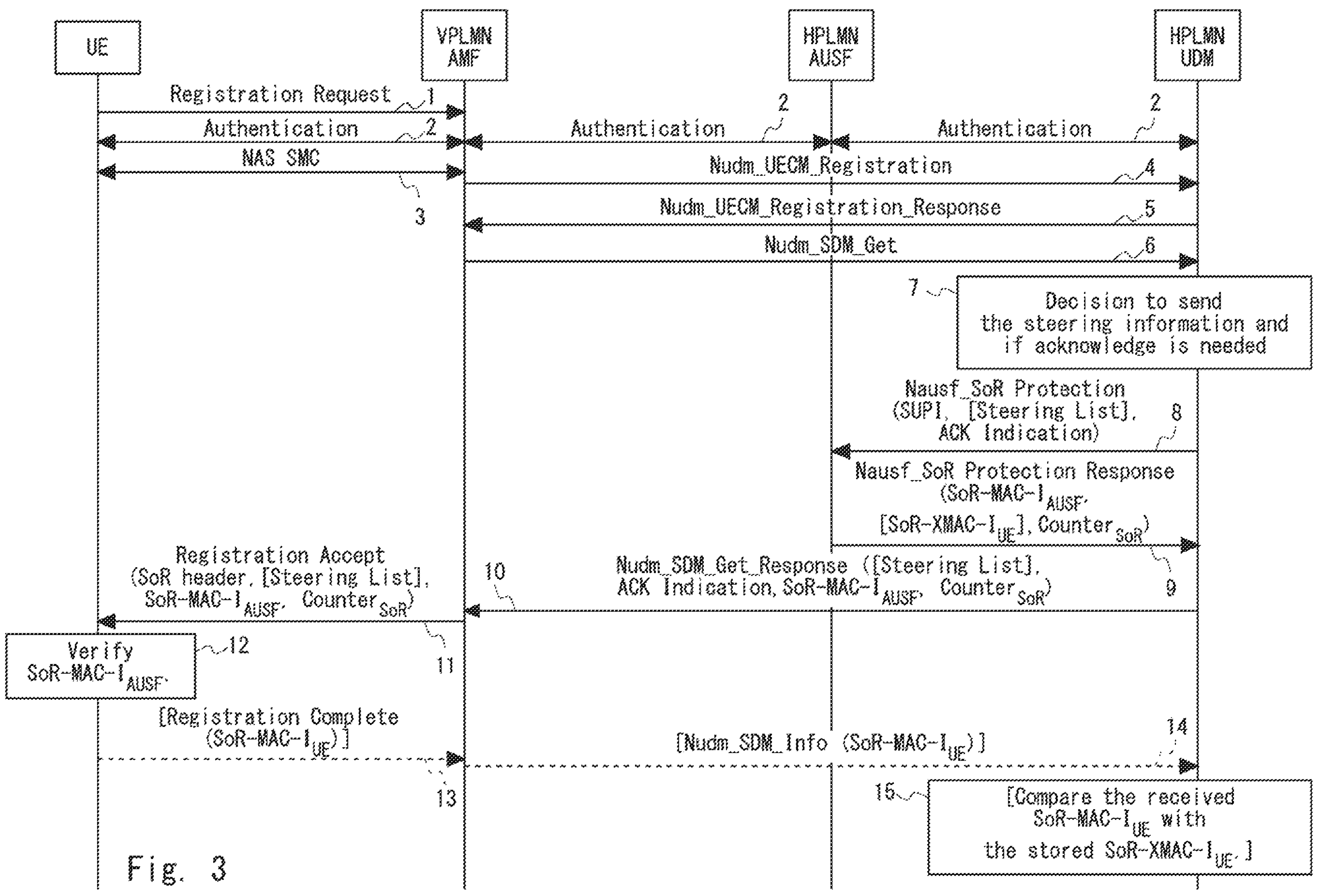
FIG. 3 is a conventional signaling diagram illustrating procedure for providing list of preferred PLMN/access technology combinations during registration in VPLMN.
Figure 4:
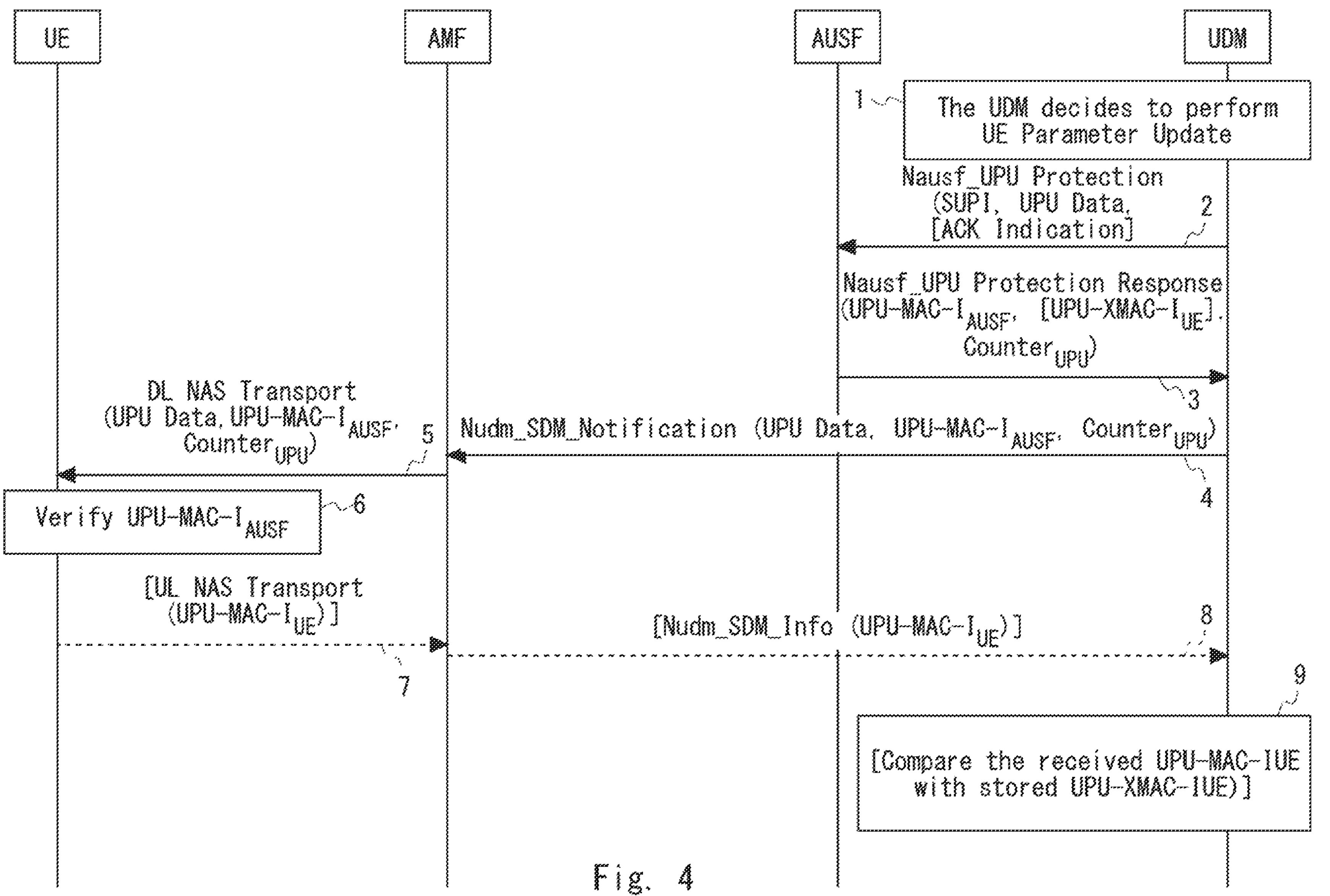
FIG. 4 is a conventional signaling diagram illustrating procedure for UE Parameters Update.

The present disclosure provides a procedure to establish latest security key in a UE and a network is disclosed. More specifically, the procedure defines various method to establish latest Kausf in the UE and the network and make the UE and network uses the same Kausf in various security procedure.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope.

The disclosure will be described and explained with additional specificity and detail with the appended figures.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or entities or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

As used herein, information is associated with data and knowledge, as data is meaningful information and represents the values attributed to parameters. Further knowledge signifies understanding of an abstract or concrete concept. Note that this example system is simplified to facilitate description of the disclosed subject matter and is not intended to limit the scope of this disclosure. Other devices, systems, and configurations may be used to implement the embodiments disclosed herein in addition to, or instead of, a system, and all such embodiments are contemplated as within the scope of the present disclosure.

Example 1 of Problem Statement 1

This Problem statement 1 applies to the 5G AKA based primary authentication and key agreement procedure.

When the UE has already registered successfully to a PLMN, a valid Kausf has been derived in the UE and the AUSF (Authentication Server Function). The network can initiate authentication procedure at any time according to the NPL 5. When a UE receives Authentication Request message containing 5G Authentication vector (5G SE AV), the UE authenticates the network by validating received AUTN (Authentication token). After successful validation of AUTN, the UE creates a new Kausf and a RES* and sends Authentication Response to the network containing RES*. At this point, the UE has two Kausfs, one is an old Kausf and the other one is a new Kausf. The authentication of the UE may be successful or failed in the network based on the verification of RES* at AMF (Access and Mobility Management Function) or AUSF. In case the authentication procedure is successful, the network will not send any NAS message to the UE. Therefore, without any explicit message received from the network, the UE is not sure when the new Kausf becomes valid and can be used in the various procedure e.g. the Steering of roaming security mechanism and UE parameters update via UDM control plane procedure security mechanism.

Example 2 of Problem Statement 2

This Problem statement 2 applies to both the EAP based primary authentication and key agreement procedure and the 5G AKA based primary authentication and key agreement procedure.

When the UE has already registered successfully to a PLMN, a valid Kausf has been derived in the UE and the AUSF. The network can initiate authentication procedure at any time according to the NPL 5. During the authentication procedure, the radio link failure may happen between the UE and the network and the authentication procedure may be aborted. For example, the AMF will abort the authentication procedure when the AMF detects radio link failure before receiving the authentication response message. In such scenarios, the UE and the network are out of synchronization for the latest Kausf being used in the UE and the network. In some cases, the UE will have more than one Kausf (the old Kausf and the new Kausf) and the UE is not sure which Kausf is to be used in the network in various security procedure involving Kausf, e.g. the Steering of roaming security mechanism and UE parameters update via UDM control plane procedure security mechanism.

<General>

The latest Kausf created in the following embodiments are used in following security procedure (security mechanism).

i) In the Steering of roaming security mechanism to calculate the SoR-MAC-Iausf and SoR-MAC-Iue in the UE and the AUSF as defined in the NPL 5.

ii) UE parameters update via UDM control plane procedure security mechanism to calculate UPU-MAC-Iausf and UPU-MAC-Iue in the UE and the AUSF as defined in the NPL 5.

iii) To derive AKMA keys as defined in the NPL 5.

In the following embodiments, when the UE makes the new Kausf as latest Kausf, then the UE shall initialize the CounterSoR or CounterUPU to 0x00. The UE may not initialize the CounterSoR or CounterUPU to 0x00 when it is derived but when the new Kausf is made latest or valid. In the following embodiments when a new Kausf is made valid in the UE and the AUSF this implies it is the new Kausf is the latest Kausf.

The embodiments defined for the 5G AKA are also be applicable for the EAP-AKA and vice versa. In addition, the term "AMF" may be interpreted as "SEAF (Security Anchor Functionality)" in the following embodiments. Further, the term "UDM" may be interpreted as "ARPF (Authentication credential Repository and Processing Function)" in the following embodiments. The following embodiments are not limited to 5GS, and the following embodiments are also applicable to communication system other than 5GS.

If the security checks fail in the Steering of roaming (SoR) procedure or the UE Parameters Update (UPU) procedure, the UE shall include the Kausf used in the security verification procedure of the SoR procedure or the UPU procedure in a NAS message (e.g. in the registration complete message or UL NAS transport message to the AMF.) to inform it to the AMF. The AMF forwards this Kausf to the UDM. In this case the UDM have two options, a Kausf comparison is executed either in the UDM or the AUDF.

Option 1 The UDM performs Kausf comparison: the UDM fetches the Kausf used in the SoR procedure or the UPU procedure from AUSF and compares the received Kausf from the UE with a Kausf received from the AUSF that is used in the SoR or the UPU procedure.

Option 2 The AUSF performs Kausf comparison: the UDM forwards the received Kausf from the AMF to the AUSF. Then the AUSF compares the received Kausf from the UDM with the latest Kausf used for the SOR or the UPU procedure. Then the AUSF informs a result of comparison to the UDM.

If the Kausf received for the UE is different from the Kausf stored in the AUSF, then the UDM initiates a new authentication procedure to the UE.

In one example when the UDM receives any signaling from an AMF for the UE, the UDM will request the AMF to initiates a new authentication procedure. Alternatively, the UDM may request the AMF to initiates re-registration procedure for the UE. In this case, the AMF performs a new authentication procedure during the registration procedure.

After the successful authentication procedure, the latest Kausf is synchronized between the UE and the network.

First Example Embodiment (Solution 1)

The UE starts a timer and after the timer expiry the new Kausf becomes valid if the UE does not receive Authentication Reject message.

This embodiment applies to both the 5G AKA based primary authentication and key agreement procedure and the EAP based primary authentication and key agreement procedure.

Figure 5:
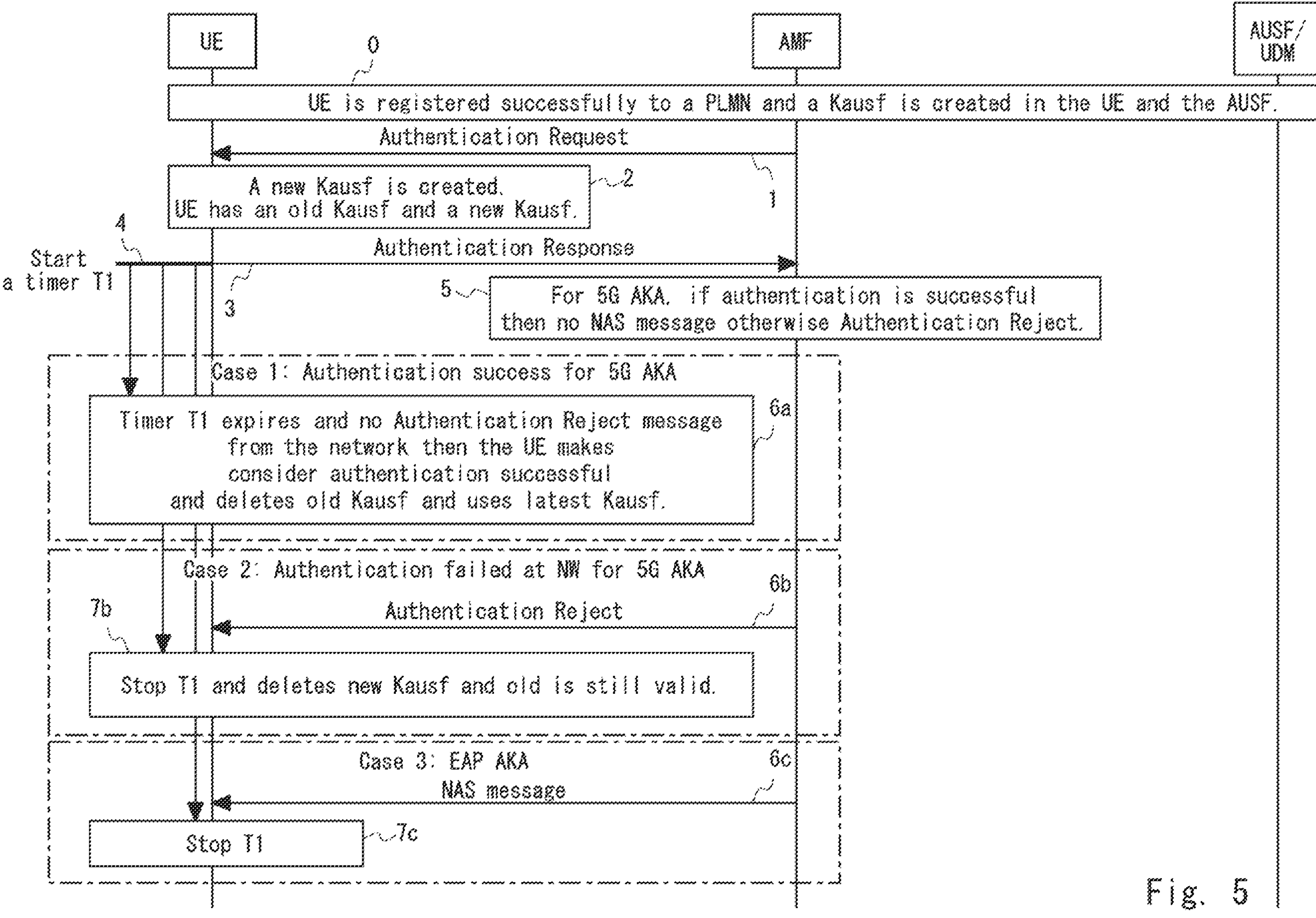
FIG. 5 is a signaling diagram illustrating an embodiment of procedure for establishing latest $K_{ausf}$ in the UE.

FIG. 5 illustrates the procedure for establishing latest Kausf in the UE based on a timer in the UE.

The detailed processes of the embodiment are described below.

0. The UE is registered to a PLMN successfully and a Kausf is created in the UE and the network. That is, the UE and the network have (or maintain or keep or store) the Kausf respectively. If the UE has not yet registered to any PLMN, then the UE does not have any valid Kausf.

1. The network (e.g. AMF) initiates the 5G AKA based primary authentication and key agreement procedure or the EAP based primary authentication and key agreement procedure and sends Authentication Request message to the UE. The AUSF stores the new Kausf received from the UDM during the authentication procedure and the old Kausf (created in step 0).

2. The UE validates the AUTN parameter received in the Authentication Request message as specified in NPL 6. After success of the validation of the AUTN parameter, the UE calculates (or creates or generates) a new Kausf (or a new Kausf parameter) based on the parameters received in the Authentication Request message and USIM parameters as specified in NPL 5. The UE will have both the old Kausf (created in step 0) and the new Kausf created in this step.

3. The UE transmits Authentication Response message containing *RES to the network.

4. The UE starts timer T1 and stores both the old Kausf and the new Kausf. While the timer T1 is running, the UE may consider the old Kausf as latest Kausf and uses it in a security mechanism involving Kausf or the UE may consider the new Kausf as latest Kausf and uses it in a security mechanism involving Kausf. For example, the UE starts the timer T1 at the same time when the UE sends the Authentication Response message containing *RES or after the UE sends the Authentication Response message containing *RES. That is, a cause of start of the time T1 is a transmission of the Authentication Response message containing *RES.

5. For the 5G AKA based primary authentication and key agreement procedure, upon receiving the Authentication Response message containing RES*, the AMF and the AUSF verify the HRES* and RES* respectively as specified in NPL 5. After successful verification of the HRES* and RES*, the AMF and AUSF consider the Kausf successful and the AUSF will start using the new Kausf created in the AUSF. In this case, the case 1, I.E. step 6a, takes place after step 5.

When the HRES* or RES* verification fails in the AMF or AUSF, then the AMF sends Registration Reject message. The AUSF treats the old Kausf as a latest Kausf and valid and uses in a security mechanism involving Kausf. In this case, the case 2, I.E. step 6b and step 7b, takes place after step 5.

For the EAP based primary authentication and key agreement procedure, the case 3, I.E. step 6c and step 7c, takes place after step 5.

6a. When the UE does not receive the Authentication Reject message and timer T1 expires, then the UE shall consider that the 5G AKA based primary authentication and key agreement procedure is successful and delete the old Kausf and make the new Kausf as latest valid Kausf and uses the new Kausf in a security mechanism involving Kausf.

6b. UE receives the authentication Reject message from the AMF while the timer T1 is running.

7b. The UE stops the timer T1 and the UE shall delete the new Kausf and uses the old Kausf and treats the old Kausf as the latest Kausf and valid.

6c. UE receives a NAS message from the AMF while the timer T1 is running. The NAS message includes either an EAP success or EAP failure.

7c. The UE stops the timer T1. The UE shall delete the old Kausf and uses the new Kausf and treats the new Kausf as the latest Kausf and valid if the EAP success is received in step 6c. The UE shall delete the new Kausf and uses the old Kausf and treats the old Kausf as the latest Kausf and valid if the EAP failure is received in step 6c.

In one example, if the radio link failure happens and the radio link failure is detected by the UE (e.g. the NG-RAN indicates, to the UE, the UE radio contact is lost during a next N1 NAS signaling connection is established or after the next N1 NAS signaling connection is established) in any of the steps while the timer T1 is running, the UE shall restart the timer T1 when a N1 NAS signaling connection is established. The timer T1 is either started with remaining value or with the original value. In this case while establishing the N1 NAS signaling connection, if the initial NAS procedure is rejected due to reason of failure of authentication procedure (e.g. Registration Reject with cause #3 (illegal UE) or Service Reject with cause #3 illegal UE), the UE shall delete the new Kausf and treats the old Kausf as the latest Kausf and valid and uses the old Kausf in a subsequent a security mechanism involving Kausf.

In one example, if the radio link failure happens and the radio link failure is detected by the network (e.g. AMF) right after the Authentication Reject message is sent by the network, the network may send the Authentication Reject message to the UE again. For example, the NG-RAN indicates, to the AMF, the UE radio contact is lost through a NGAP message.

In one example, the UE may not hold (or not maintain or not keep or not store or not have) an old Kausf. For example, the UE may not hold an old Kausf when the UE just powered-on in a very first time or before the UE initiates the initial Registration procedure.

In this case, all situations in the embodiment where the old Kausf becomes valid imply to that UE has no valid Kausf. For example, "the UE shall delete the new Kausf and treats the old Kausf as the latest Kausf and valid and uses the old Kausf in a subsequent security mechanism involving Kausf." in this embodiment implies "the UE shall delete the new Kausf and the UE has no valid Kausf". In this case, the UE may initiate a Registration procedure after deleting the new Kausf. For example, "(the UE shall) delete the old Kausf and make the new Kausf as latest valid Kausf and uses the new Kausf in a security mechanism involving Kausf" in this embodiment implies "(the UE shall) make the new Kausf as latest valid Kausf and uses the new Kausf in a security mechanism involving Kausf".

Variant of the First Embodiment

While timer T1 is running, the UE maintains both the old Kausf and the new Kausf and treats them as latest Kausf and valid. The UE shall use the old Kausf and the new Kausf in the security mechanism involving Kausf. If the security mechanism is passed using one of these keys, the UE shall treat that key as latest and valid and delete the other key. For example, if the security mechanism is passed using the old Kausf, the UE shall treat the old Kausf as latest and valid and delete the new Kausf. In addition, for example, if the security mechanism is passed using the new Kausf, the UE shall treat the new Kausf as latest and valid and delete the old Kausf.

Second Example Embodiment (Solution 2)

The AMF sends Authentication Result after the authentication procedure is successful in the AMF.

This embodiment applies to the 5G AKA based primary authentication and key agreement procedure.

Figure 6:
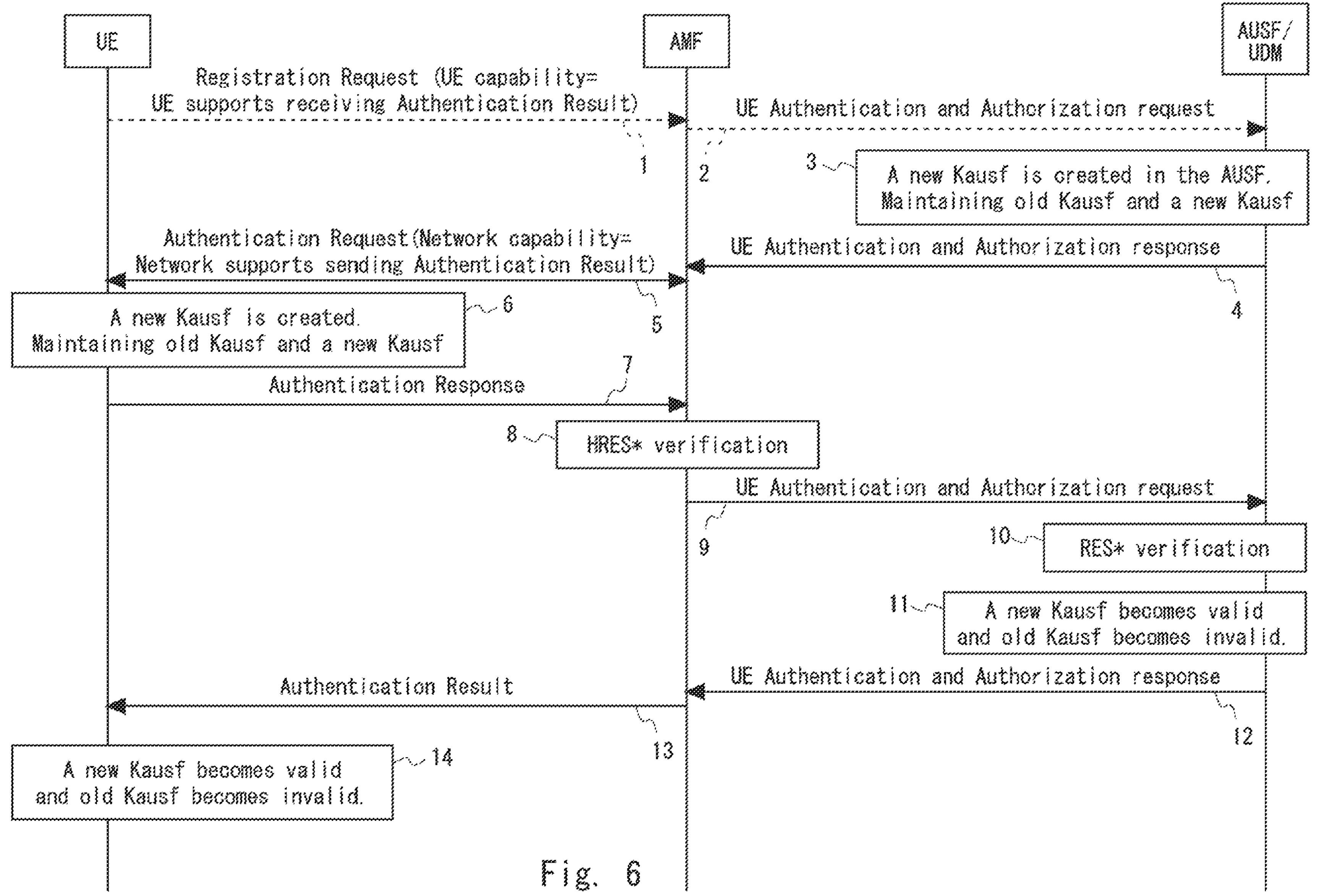
FIG. 6 is a signaling diagram illustrating an embodiment of procedure for establishing latest $K_{ausf}$ in the UE and the network.

FIG. 6 illustrates the procedure for establishing latest Kausf in the UE and the network with explicit NAS signaling.

The detailed processes of the embodiment are described below. The UE and the AUSF have (or maintain or keep or store) an old Kausf respectively.

1. For the registration procedure as a trigger to the 5G AKA based primary authentication and key agreement procedure, the UE sends Registration Request message containing a first Information Element (IE) indicating to the network that the UE supports reception of an acknowledgement message (e.g. Authentication Result) sent by the network on successful authentication procedure. Sending of this capability is optional in the Registration Request message i.e. this capability can be sent in other existing NAS message (e.g. Authentication Response) also or in a new NAS message during any NAS procedure. The registration procedure can be initial registration procedure or periodic registration or mobility registration procedure. The network (e.g. AMF) stores this UE capability.

2. The AMF sends UE Authentication and Authorization request to the AUSF/UDM to initiate the 5G AKA based primary authentication and key agreement procedure.

3. The UDM generates AV (Authentication Vector). Then a new Kausf is created in the AUSF. The AUSF maintains both the old Kausf and a new Kausf at this point.

4. The AUSF/UDM sends UE Authentication and Authorization response to the AMF.

5. The AMF sends Authentication Request message to the UE. The Authentication Request message may contain the network capability to send the NAS acknowledgement message on successful completion of the 5G AKA based primary authentication and key agreement procedure. The UE stores this capability when it receives the Authentication Request message. Sending of this capability is optional in the Authentication Request message i.e. this capability can be sent in other existing NAS message (e.g. Registration Accept) also or in a new NAS message during any NAS procedure. For example, the AMF sends the Authentication Request message to the UE if the UE has indicated to the AMF that it supports reception of an NAS acknowledgement message sent by the network on successful 5G AKA based primary authentication and key agreement procedure.

6. Upon reception of the Authentication Request message, the UE validates the AUTN as specified in NPL 6. After successful validation of the AUTN, the UE calculates (or creates or generates) the new Kausf and RES*. The UE stores both the old Kausf (latest Kausf created before this step) and the new Kausf. The UE still uses the old Kausf as the latest Kausf and valid in any security procedure involving Kausf.

If the network indicated earlier that it supports sending of an acknowledgement message (e.g. Authentication Result) on successful authentication procedure, the UE waits for the NAS acknowledgement message and does not use the new Kausf in any subsequent security procedure involving Kausf until the NAS acknowledgement message, indicating successful authentication procedure, comes.

7. The UE sends Authentication Response message to the AMF containing RES*.

8. The AMF performs the HRES* and HXRES* comparison.

9. Upon successful verification of HRES* at the AMF, the AMF sends the UE Authentication and Authorization request to the AUSF/UDM.

10. The AUSF performs the RES* and XRES* comparison.

11. Upon successful verification of RES* at the AUSF, the AUSF considers the new Kausf as valid and deletes old Kausf. The AUSF starts using the new Kausf as the latest Kausf and valid in subsequent security procedure involving Kausf.

12. The AUSF/UDM sends UE Authentication and Authorization response to the AMF.

13. If the UE has indicated to AMF that it supports reception of an NAS acknowledgement message sent by the network on successful 5G AKA based primary authentication and key agreement procedure, the AMF sends an existing NAS message or a new NAS message indicating the success of the 5G AKA based primary authentication and key agreement procedure, otherwise the AMF does not send the NAS acknowledgement message indicating the success of the 5G AKA based primary authentication and key agreement procedure. For example, the AMF sends, to the UE, Authentication Result indicating the success of the 5G AKA based primary authentication and key agreement procedure.

14. Upon reception of the NAS acknowledgement message, the UE deletes the old Kausf and starts using the new Kausf as the latest Kausf and valid in security procedure involving Kausf.

In one example, the UE may not hold (or not maintain or not keep or not store or not have) an old Kausf. For example, UE may not hold an old Kausf when the UE just powered-on in a very first time or before the UE initiates the initial Registration procedure.

For example, "the UE deletes the old Kausf and starts using the new Kausf as the latest Kausf and valid in security procedure involving Kausf" in this embodiment implies "the UE starts using the new Kausf as the latest Kausf and valid in security procedure involving Kausf".

Variant 1 of the Second Embodiment

After step 14, the UE may send an Authentication Acknowledgment message to the AMF in order to indicate the AMF successful UE authentication procedure. When the AMF receives the Authentication Acknowledgment message from the UE, the AMF confirms that the UE authentication procedure is successful and the AMF sends a UE Authentication and Authorization notify to the AUSF/UDM to indicate successful UE authentication procedure. When the AUSF/UDM receives the UE Authentication and Authorization notify indicating successful UE authentication procedure, the AUSF considers the new Kausf as valid and deletes old Kausf. The AUSF starts using the new Kausf as the latest Kausf and valid in subsequent security procedure involving Kausf. In this variant, the step 11 does not take place in the AUSF. I.e., the AUSF does not consider the new Kausf as valid at the step 11.

In one example, the AMF initiates a timer T3 to wait the Authentication Acknowledgment message to come from the UE when the AMF sends the existing NAS message or a new NAS message in step 13. If the timer T3 expires, the AMF may resend the existing NAS message or the new NAS message indicating the success of the 5G AKA based primary authentication and key agreement procedure as indicated in step 13.

In one example the UE and the network execute the steps defined in second embodiments without exchanging and checking the capability to receive authentication result or send authentication result message.

Variant 2 of the Second Embodiment

If the UE has PDU session for emergency service or establishing the PDU session for emergency services and the UE receives security mode command message with null encryption and null ciphering algorithm (NIAO and NEAO) after sending the authentication response message, then the UE shall not make Kausf created during the authentication procedure as latest i.e. it shall not use the Kausf in any security procedure involving Kausf. The UE may delete the Kausf. In one example the UE deletes the Kausf after the PDU session related to emergency service is released/deactivated or UE goes to 5GMM DEREGISTERED state.

In one example if the authentication result indicates authentication procedures failed and the UE receives Security mode command message, then the UE shall make the Kausf created during the latest authentication procedure as invalid. if the UE has old Kaus which is being used in security procedure the UE shall keep using that Kausf in the security procedure. This procedure is applicable for both 5G AKA and EAP AKA or other authentication method used in 5GS.

Third Example Embodiment (Solution 3)

A UE initiates procedure to establish latest Kausf.

This embodiment applies to both the 5G AKA based primary authentication and key agreement procedure and the EAP based primary authentication and key agreement procedure.

Figure 7:
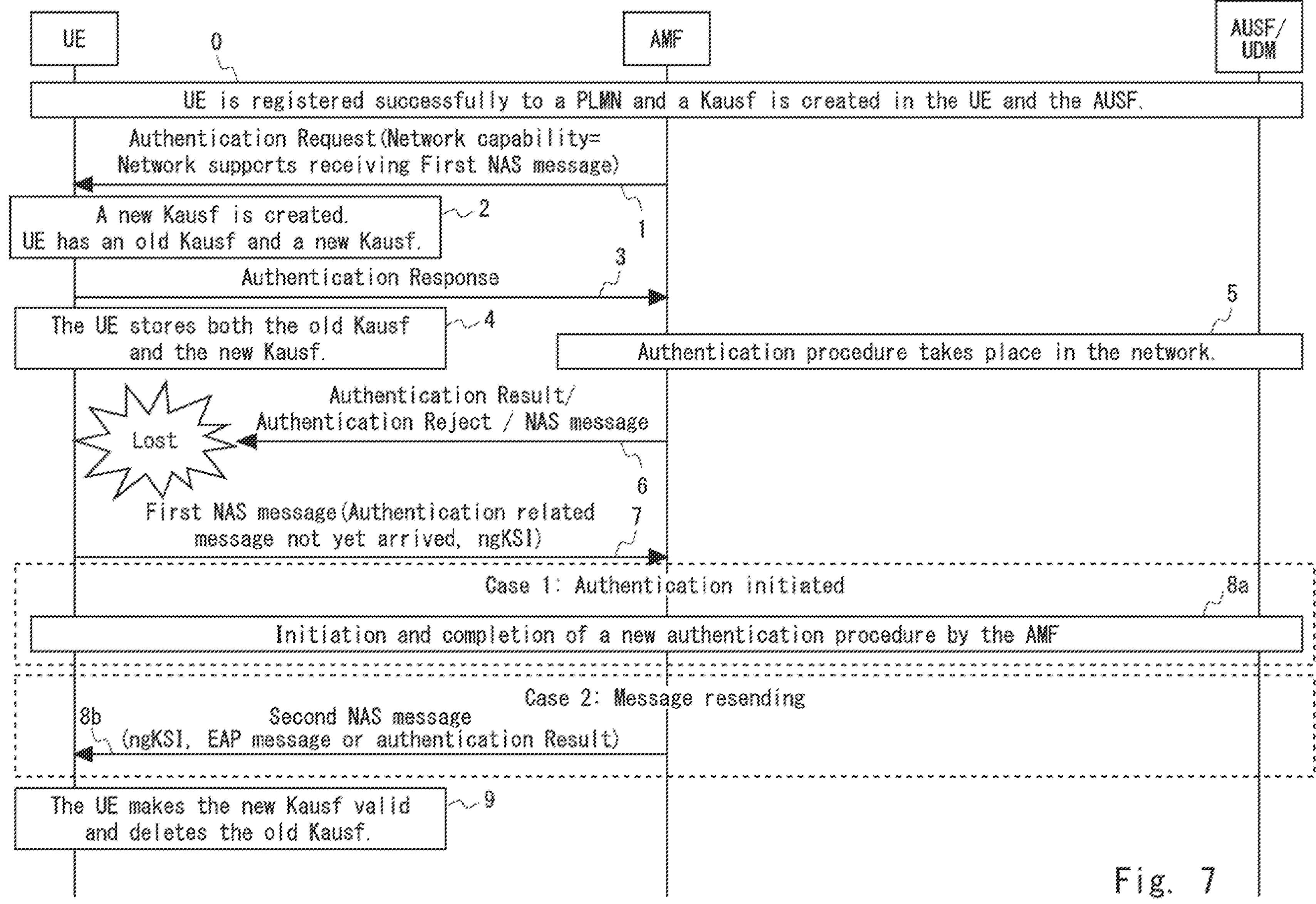
FIG. 7 is a signaling diagram illustrating an embodiment of procedure for creating the latest $K_{ausf}$ in the UE and the network.

FIG. 7 illustrates a procedure for creating the latest Kausf in the UE and the network.

The detailed processes of the embodiment are described below.

0. The UE is registered to a PLMN successfully and a Kausf is created in the UE and the network. That is, the UE and the network have (or maintain or keep or store) the Kausf respectively. If the UE has not yet registered to any PLMN, then the UE does not have any valid Kausf.

1. The network (e.g. AMF) initiates the 5G AKA based primary authentication and key agreement procedure or the EAP based primary authentication and key agreement procedure and sends Authentication Request message to the UE. The AUSF stores the new Kausf received from the UDM during the authentication procedure and the old Kausf (created in step 0). The Authentication Request message may contain the network capability to receive the First NAS message, in step 7, in case that UE detects a radio link failure during the 5G AKA based primary authentication and key agreement procedure and the EAP based primary authentication and key agreement procedure. The UE stores this capability when it receives Authentication Request message. Sending of this capability is optional in the Authentication Request message i.e. this capability can be sent in other existing NAS message (e.g. Registration Accept) also or in a new NAS message during any NAS procedure.

2. The UE validates the AUTN parameter received in the Authentication Request message as specified in NPL 6. After success of the validation of the AUTN parameter, the UE calculates (or creates or generates) a new Kausf (or a new Kausf parameter) based on the parameters received in the Authentication Request message and USIM parameters as specified in NPL 5. The UE will have both the old Kausf (created in step 0) and the new Kausf created in this step.

3. The UE transmits Authentication Response message containing *RES to the network.

4. The UE stores both the old Kausf and the new Kausf created in step 2.

5. The network performs the 5G AKA based primary authentication and key agreement procedure or the EAP based primary authentication and key agreement procedure based on a selection made by the UDM.

6. For the 5G AKA based primary authentication and key agreement procedure, upon receiving the Authentication Response message containing RES*, the AMF and the AUSF verify the HRES* and RES* respectively as specified in NPL 5. After successful verification of the HRES* and RES*, the AMF and AUSF considers the Kausf successful and the AUSF will start using the new Kausf created in the AUSF. In this case, the AMF sends, to the UE, the Authentication Result message indicating the success of the 5G AKA based primary authentication and key agreement procedure. When the HRES* or RES* verification fails in the AMF or AUSF, then the AMF sends the Registration Reject message to the UE.

For the EAP based primary authentication and key agreement procedure, the AMF sends NAS message to the UE. Note that the AMF may sends multiple NAS messages to the UE during the EAP based primary authentication and key agreement procedure.

In this step, the Authentication Result message or the Authentication Reject message or the NAS message may be lost due to radio link failure between the network and the UE.

7. In case that the UE detects the radio link failure during the 5G AKA based primary authentication and key agreement procedure or the EAP based primary authentication and key agreement procedure, the UE sends the First NAS message to the AMF during an establishment of the next N1 NAS signaling connection. For example, the UE starts a timer when the UE sends the Authentication Response, and the UE detects the radio link failure when the UE does not receive the Authentication Result message or the Authentication Reject message or the NAS message in step 6 and the timer is expired.

For example, the NG-RAN may indicate to the UE that the radio link failure has happened before sending the First NAS message to the AMF during an establishment of the next N1 NAS signaling connection. The first NAS message can be new NAS message or existing NAS message (e.g. Registration Request message when a registration procedure is initiated or Service Request message when Service Request procedure is initiated). The First NAS message includes an Information Element (IE) indicating, to the AMF, that the UE has not completed the 5G AKA based primary authentication and key agreement procedure or the EAP based primary authentication and key agreement procedure. I.E, if the 5G AKA based primary authentication and key agreement procedure took place, either the Authentication Result message or the Authentication Reject message has not yet received. If the EAP based primary authentication and key agreement procedure took place, a NAS message that carries next EAP message for the EAP based primary authentication and key agreement procedure has not yet received. The UE may also include the ngKSI (Key Set Identifier in 5G) in the First NAS message. Upon reception of the First NAS message, the AMF performs either case 1 (step 8a), or case 2 (step 8b).

After step 4, in case that the N1 NAS signaling connection establishment procedure takes place and if the UE receives Security Mode Command message containing ngKSI matching the ngKSI associated with the new Kausf, then the UE shall delete the old Kausf and make the new Kausf as latest Kausf and valid and start using the latest Kausf. The UE can make this decision because the ngKSI in the received Security Mode Command message from the AMF can be an evidence that the AMF maintains the new Kausf as latest Kausf and valid.

8a. The AMF initiates a fresh authentication procedure. Upon successfully completion of the authentication procedure, the UE and the AUSF start using the latest Kausf created during the authentication procedure.

8b. The AMF sends a second NAS message to the UE. The second NAS message can be the message in step 6. I.E. the Authentication Result message, the Authentication Reject message or NAS message containing EAP message. The second NAS message can be DL NAS Transport message, Registration Accept message or Service Accept message containing the result of the latest executed the EAP based primary authentication and key agreement procedure. If ngKSI is received in the step 7 from the UE, the AMF sends the result of the EAP based primary authentication and key agreement procedure corresponding to the received ngKSI.

9. For the 5G AKA based primary authentication and key agreement procedure, when the UE receives the Authentication Result message as the second NAS message, then the UE deletes the old Kasuf and makes the new Kausf as the latest Kausf and valid and starts using the new Kausf in the subsequent security procedure involving Kausf. When the UE receives the Authentication Reject message as the second NAS message, the UE deletes the new Kausf and keeps using the old Kausf as the latest Kausf and valid in a security procedure involving Kausf.

For EAP based primary authentication and key agreement procedure, when the UE receives the second NAS message containing authentication result (EAP message) and if the EAP authentication result contains EAP failure message, then the UE deletes the new Kausf and keep using the old Kausf as the latest Kausf and valid in a security procedure involving Kausf. If the authentication result includes EAP success, then the UE deletes the old Kasuf and makes the new Kausf as the latest Kausf and valid and starts using the new Kausf in the subsequent security procedure involving Kausf. If the second message contains the ngKSI, then the UE uses the received ngKSI to find an associated Kausf in the UE. The UE uses the found Kausf as the latest Kausf and valid in the subsequent security procedure involving Kausf.

In one example, the UE may not hold (or not maintain or not keep or not store or not have) the old Kausf. For example, the UE may not hold the old Kausf when the UE just powered-on in a very first time or before the UE initiates the initial Registration procedure.

In this case, all situations in the embodiment where the old Kausf becomes valid imply to that the UE has no valid Kausf. For example, "the UE deletes the new Kausf and keep using the old Kausf as the latest Kausf and valid in a security procedure involving Kausf." in this embodiment implies "the UE deletes the new Kausf and the UE has no valid Kausf". In this case, the UE may initiate a Registration procedure after deleting the new Kausf. For example, "the UE shall delete the old Kausf and make the new Kausf as latest Kausf and valid and start using the latest Kausf" in this embodiment implies "the UE shall make the new Kausf as latest Kausf and valid and start using the latest Kausf".

Variant 1 of the Third Embodiment

In step 7 of this embodiment, the UE includes the list of Kausf that the UE maintains (e.g. the old Kausf or the new Kausf). The AMF verifies which Kausf of the list is being used by the AUSF. Then the AMF returns the matched Kausf being used by the AUSF to the UE in the second NAS message. The UE shall make the received Kausf as latest Kausf and valid and start using this in subsequent security mechanism requiring Kausf. In one example the UE does not include list of Kausf, then the AMF fetches the latest Kausf from the AUSF and sends this Kausf to the UE in the second NAS message.

In one example, the UE and AMF or AUSF maintain the association between Kausf and ngKSI. The UE sends the list of ngKSI associated with Kausf that the UE maintains in the first NAS message in step 7. The network (AMF or AUSF) matches the received ngKSI with the ngKSI of the latest Kausf. The AMF returns the matched ngKSI being used by the AUSF to the UE. The UE shall make the Kausf associated with the received ngKSI as latest Kausf and valid and start using this in security procedure requiring Kausf. If the ngKSI list is not sent in the first NAS message, the AMF shall send the ngKSI of the latest Kausf being used by the AUSF in the second NAS message. Upon reception of the second NAS message, the UE shall make the Kausf corresponding to the ngKSI as latest Kausf and valid.

Variant 2 of the Third Embodiment

In this embodiment, the radio link failure detected by the UE can be considered as a trigger to send the First NAS message to the AMF.

As a variant of this trigger, the UE may start timer T1, as described in the embodiment 1, when the UE sends the Authentication Response message to the AMF. If the timer T1 expires, then the UE can considered this timer expiry as a trigger to send the First NAS message to the AMF. Hence the UE sends the First NAS message to the AMF when the timer T1 expires.

The UE stops the timer T1 when the second message is received by the UE.

Fourth Example Embodiment (Solution 4)

This embodiment applies to both the 5G AKA based primary authentication and key agreement procedure and the EAP based primary authentication and key agreement procedure.

In the first, second and third embodiments, when the UE receives the steering of roaming information in Registration accept message or Configuration Update Command message while the UE has more than one Kausf, then the UE shall perform the security check of the steering of roaming using each Kausf. If the security check is passed using a Kausf, then the UE shall make the Kausf as the latest Kausf and valid and start using the Kausf in subsequent security procedure requiring Kausf. The UE will apply the same processes for the case of UE Parameters Update procedure. For example, in case where the UE performs a security check of a security procedure or a security mechanism (for example, the steering of roaming or UE Parameters Update procedure) and the UE has two Kausfs (for example, an old Kausf and a new Kausf), and if the security check is passed (or completed successfully) using the old Kausf, the UE shall make the old Kausf as the latest Kausf and valid and start using the old Kausf in subsequent security procedure requiring Kausf, and may delete the new Kausf. In addition, in case where the UE performs the security check and the UE has two Kausfs (for example, an old Kausf and a new Kausf), and if the security check is passed using the new Kausf, the UE shall make the new Kausf as the latest Kausf and valid and start using the new Kausf in subsequent security procedure requiring Kausf, and may delete the old Kausf.

Furthermore, for example, in case where the UE performs the security check and the UE has two Kausfs, firstly the UE may perform the security check using one Kausf of the two Kausf. If the security check is passed using the one Kausf, the UE shall make the one Kausf as the latest Kausf and valid and start using the one Kausf in subsequent security procedure requiring Kausf, and may delete another Kausf. If the security check is not passed using the one Kausf, the UE may perform the security check using another Kausf of the two Kausfs. If the security check is passed using the another Kausf, the UE shall make the another Kausf as the latest Kausf and valid and start using the another Kausf in subsequent security procedure requiring Kausf, and may delete the one Kausf.

In one example, the UE may not hold (or not maintain or not keep or not store or not have) an old Kausf. For example, UE may not hold the old Kausf when the UE just powered-on in a very first time or before the UE initiates the initial Registration procedure.

In this case, the UE receives the steering of roaming information in Registration accept message or Configuration Update Command message while the UE has one Kausf and the UE has not received the Authentication Result message, then the UE shall perform the security check of the steering of roaming using the Kausf. If the security check is passed using the Kausf, the UE shall make the Kausf as the latest Kausf and valid and start using the Kausf in subsequent security procedure requiring Kausf.

Fifth Example Embodiment (Solution 5)

Resend Authentication Request message when radio link failure detected in the AMF when the AMF is waiting for Authentication Response message.

Figure 8:
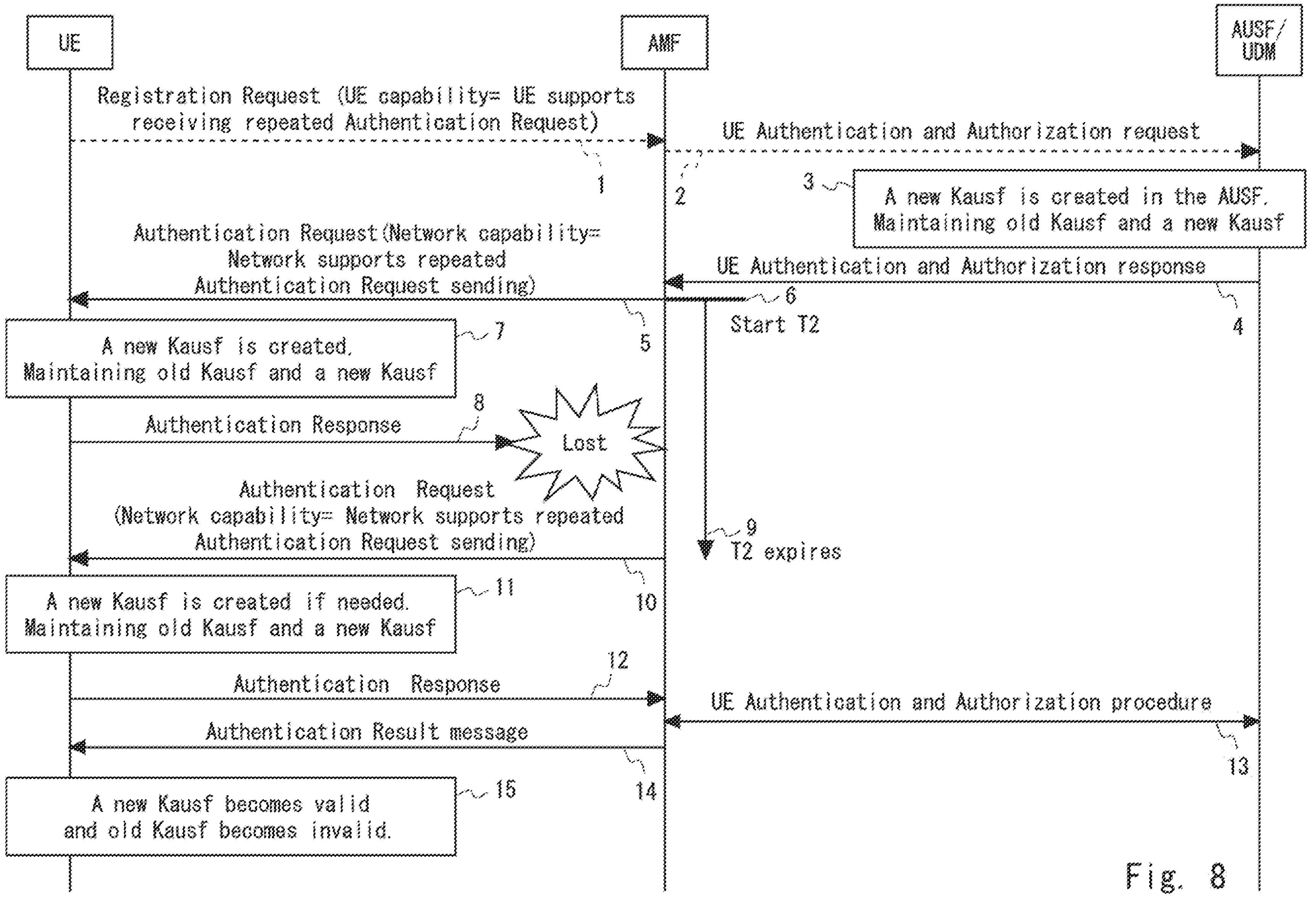
FIG. 8 is a signaling diagram illustrating an embodiment of procedure for creating the latest $K_{ausf}$ in the UE and the network.

This embodiment applies to both the 5G AKA based primary authentication and key agreement procedure and the EAP based primary authentication and key agreement procedure. FIG. 8 illustrates a procedure for creating the latest Kausf in the UE and the network.

The detailed processes of the embodiment are described below. The UE and the AUSF have (or maintain or keep or store) an old Kausf respectively.

1. For the registration procedure as a trigger to the UE authentication procedure, the UE sends Registration Request message containing a first Information Element (IE) indicating to the network that the UE supports repeated reception of an authentication related message (e.g. Authentication Result, Authentication Reject, DL NAS transport message) sent by the network during the UE authentication procedure. Sending of this capability is optional in the Registration Request message i.e. this capability can be sent in other existing NAS message also or in a new NAS message during any NAS procedure. The registration procedure can be initial registration procedure or periodic registration or mobility registration procedure. The network (e.g. AMF) stores this UE capability.

2. The AMF sends UE Authentication and Authorization request to the AUSF/UDM to initiate the 5G AKA based primary authentication and key agreement procedure or the EAP based primary authentication and key agreement procedure.

3. The UDM generates AV. Then a new Kausf is created in the AUSF. The AUSF maintains both the old Kausf and the new Kausf at this point.

4. The AUSF/UDM sends UE Authentication and Authorization response to the AMF.

5. The AMF sends Authentication Request message to the UE. The Authentication Request message may contain the network capability to send an authentication related message (e.g. Authentication Result, Authentication Reject, and DL NAS transport message) repeatedly if the authentication related message is lost between the UE and the AMF. The UE stores this capability when it receives Authentication Request message. Sending of this capability is optional in the Authentication Request message i.e. this capability can be sent in other existing NAS message (e.g. Registration Accept) also or in a new NAS message during any NAS procedure.

6. The AMF starts timer T2. For example, the AMF starts the timer T2 at the same time when the AMF sends the Authentication Request message of the step 5 or after the AMF sends the Authentication Request message of the step 5. That is, a cause of start of the time T2 is a transmission of the Authentication Request message of the step 5. The timer T2 may be a new timer or existing timer. The T2 may be T3560.

7. Upon reception of the Authentication Request message, the UE validates the AUTN as specified in NPL 6. After successful validation of the AUTN, the UE calculates (or creates or generates) the new Kausf and RES*. The UE stores both the old Kausf (latest Kausf created before this step) and the new Kausf. The UE still uses the old Kausf as the latest Kausf and valid in any security procedure involving Kausf.

If the network indicated earlier that it supports sending of an authentication related message (e.g. Authentication Result, Authentication Reject, DL NAS transport message) repeatedly, the UE should be able to process any repeated authentication related message although it processed once.

8. The UE sends Authentication Response message to the AMF containing RES*. But this message is lost and cannot be reached to the AMF. For example, the Authentication Response message is lost and cannot be reached to the AMF due to a radio link failure.

9. The timer T2 expires at the AMF.

10. At the timer T2 expiry, the AMF sends the authentication related message that has been sent in the step 5 to the UE.

In one example, when the AMF detects radio link failure while the timer T2 is running, the AMF stops the timer T2 and immediately sends the Authentication Request message to the UE on detection of the radio link failure. I.e. the AMF does not wait the timer T2 expiry. For example, the NG-RAN indicates, to the AMF, the UE radio contact is lost through a NGAP message and the AMF detects the radio link failure based on the NGAP message. In addition, for example, the AMF may keep the timer T2 running if the AMF detects the radio link failure, and then the AMF sends the authentication related message that has been sent in the step 5 to the UE, in a case where the timer T2 expires.

11. Upon reception of the Authentication Request message, the UE validates the AUTN as specified in NPL 6. After successful validation of the AUTN, the UE calculates (or creates or generates) the new Kausf and RES*. The UE stores both the old Kausf (latest Kausf created before this step) and the new Kausf. The UE still uses the old Kausf as the latest Kausf and valid in any security procedure involving Kausf.

12. The UE sends Authentication Response message to the AMF containing RES*.

13. The network performs the UE authentication procedures.

14. Upon successful verification of HRES* and RES* at the AMF and AUSF respectively, the AMF sends the Authentication Result message to the UE.

15. Upon reception of the Authentication Result message, the UE deletes the old Kausf and starts using the new Kausf as the latest Kausf and valid in security procedure involving Kausf.

In one example, the UE may not hold (or not maintain or not keep or not store or not have) an old Kausf. For example, the UE may not hold an old Kausf when the UE just powered-on in a very first time or before the UE initiates the initial Registration procedure.

In this case, for example, "the UE deletes the old Kausf and starts using the new Kausf as the latest Kausf and valid in security procedure involving Kausf" in this embodiment implies "the UE starts using the new Kausf as the latest Kausf and valid in security procedure involving Kausf".

Variant of the Embodiment 5

In this embodiment, the repeated sending of the Authentication Request message by the AMF due to the timer T2 expiry is disclosed.

One example, this repeated message sending mechanism by the timer T2 expiry can be used for the EAP based primary authentication and key agreement procedure. As there are multiple NAS messages communicated between the UE and the AMF during the EAP based primary authentication and key agreement procedure, this embodiment can be used any authentication related NAS message from the AMF to the UE for the NAS message resending. I.E., any NAS messages that contains the EAP message in step 5 can be sent repeatedly by the AMF in step 10 when the timer T2 expires.

Sixth Example Embodiment (Solution 6)

The AMF initiates a new authentication procedure on detection of radio link failure before reception of the Authentication Response message.

This embodiment applies to both the 5G AKA based primary authentication and key agreement procedure and the EAP based primary authentication and key agreement procedure.

Figure 9:
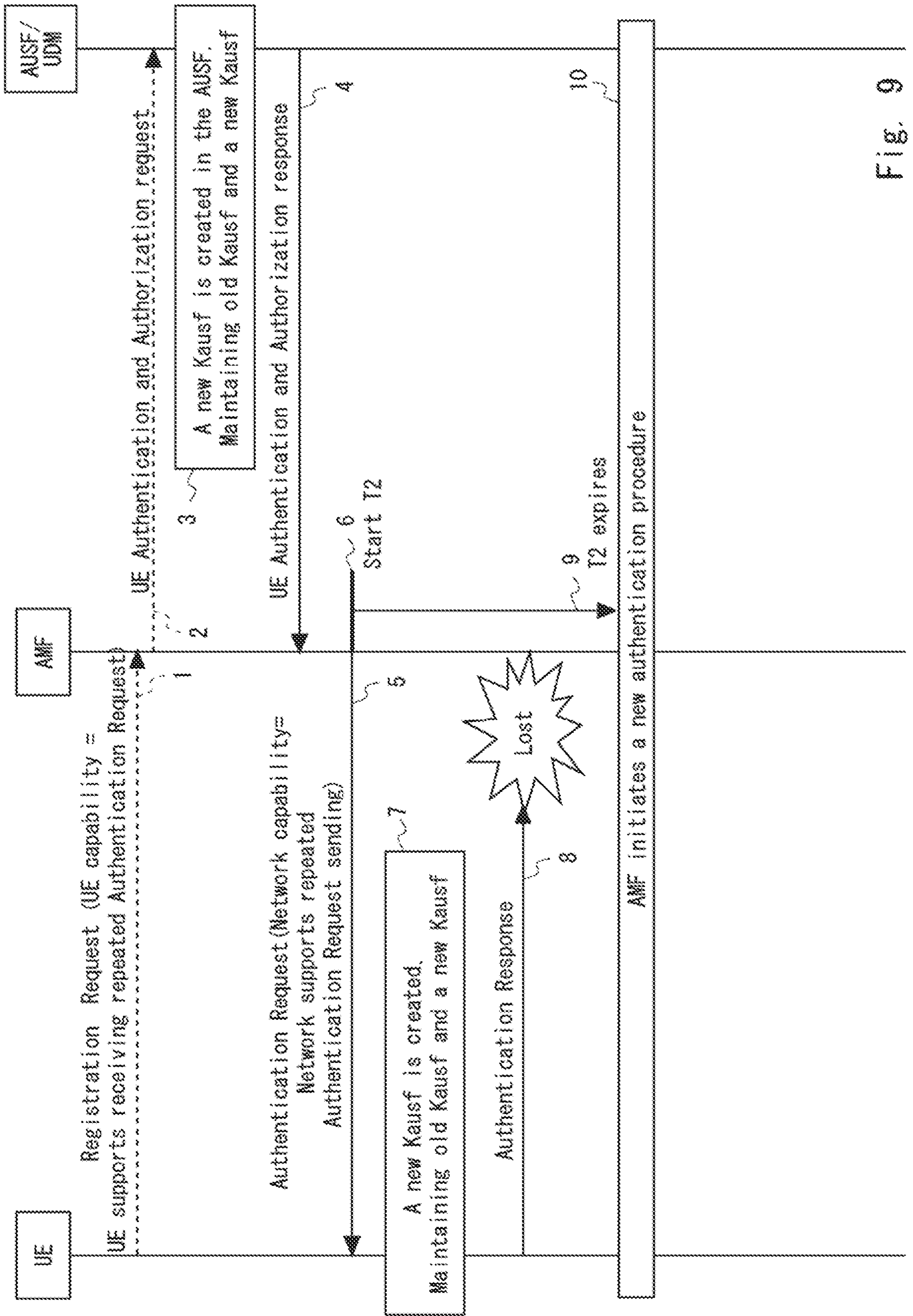
FIG. 9 is a signaling diagram illustrating an embodiment of establishment of the latest $K_{ausf}$ in the UE and the network.

FIG. 9 illustrates a procedure for creating the latest Kausf in the UE and the network.

The detailed processes of the embodiment are described below. The UE and the AUSF have (or maintain or keep or store) an old Kausf respectively.

1. For the registration procedure as a trigger to the UE authentication procedure, the UE sends Registration Request message containing a first Information Element (IE) indicating to the network that the UE supports repeated reception of an authentication related message (e.g. Authentication Result, Authentication Reject, DL NAS transport message) sent by the network during the UE authentication procedure. Sending of this capability is optional in the Registration Request message i.e. this capability can be sent in other existing NAS message also or in a new NAS message during any NAS procedure. The registration procedure can be initial registration procedure or periodic registration or mobility registration procedure. The network (e.g. AMF) stores this UE capability.

2. The AMF sends UE Authentication and Authorization request to the AUSF/UDM to initiate the 5G AKA based primary authentication and key agreement procedure or the EAP based primary authentication and key agreement procedure.

3. The UDM generates AV. Then a new Kausf is created in the AUSF. The AUSF maintains both the old Kausf and the new Kausf at this point.

4. The AUSF/UDM sends UE Authentication and Authorization response to the AMF.

5. The AMF sends Authentication Request message to the UE. The Authentication Request message may contain the network capability to send an authentication related message (e.g. Authentication Result, Authentication Reject, and DL NAS transport message) repeatedly if the authentication related message is lost between the UE and the AMF. The UE stores this capability when it receives Authentication Request message. Sending of this capability is optional in the Authentication Request message i.e. this capability can be sent in other existing NAS message (e.g. Registration Accept) also or in a new NAS message during any NAS procedure.

6. The AMF start timer T2. For example, the AMF starts the timer T2 at the same time when the AMF sends the Authentication Request message of the step 5 or after the AMF sends the Authentication Request message of the step 5. That is, a cause of start of the time T2 is a transmission of the Authentication Request message of the step 5.

7. Upon reception of the Authentication Request message, the UE validates the AUTN as specified in NPL 6. After successful validation of the AUTN, the UE calculates (or creates or generates) the new Kausf and RES*. The UE stores both the old Kausf (latest Kausf created before this step) and the new Kausf. The UE still uses the old Kausf as the latest Kausf and valid in any security procedure involving Kausf.

If the network indicated earlier that it supports sending of an authentication related message (e.g. Authentication Result, Authentication Reject, DL NAS transport message) repeatedly, the UE should be able to process any repeated authentication related message although it processed once.

8. The UE sends Authentication Response message to the AMF containing RES*. But this message is lost and cannot be reached to the AMF. For example, the Authentication Response message is lost and cannot be reached to the AMF due to a radio link failure.

9. The timer T2 expires at the AMF.

10. At the timer T2 expiry, the AMF starts a fresh authentication procedure by sending the UE Authentication and Authorization request to the AUSF/UDM as indicated in step 2 of FIG. 9. After successful completion of the UE authentication procedure between the UE and the network, the UE and the AUSF start using the Kasuf created during this fresh authentication procedure for a security procedure involving Kausf.

In one example the AMF starts the fresh authentication procedure when the AMF detects radio link failure while the timer T2 is running. In this case the AMF stops the timer T2 and immediately sends the UE Authentication and Authorization request to the AUSF/UDM as indicated in step 2 of FIG. 9. I.e. the AMF does not wait the timer T2 expiry. For example, the NG-RAN indicates, to the AMF, the UE radio contact is lost through a NGAP message and the AMF detects the radio link failure based on the NGAP message. In addition, for example, the AMF may keep the timer T2 running if the AMF detects the radio link failure, and then the AMF sends the Authentication and Authorization request to the AUSF/UDM as indicated in step 2 of FIG. 9, in a case where the timer T2 expires.

In one example, the UE may not hold an old Kausf. For example, UE may not hold an old Kausf when the UE just powered-on in a very first time or before the UE initiates the initial Registration procedure.

Above processes in this embodiment can be applicable to this example.

<User Equipment (UE)>

Figure 10:
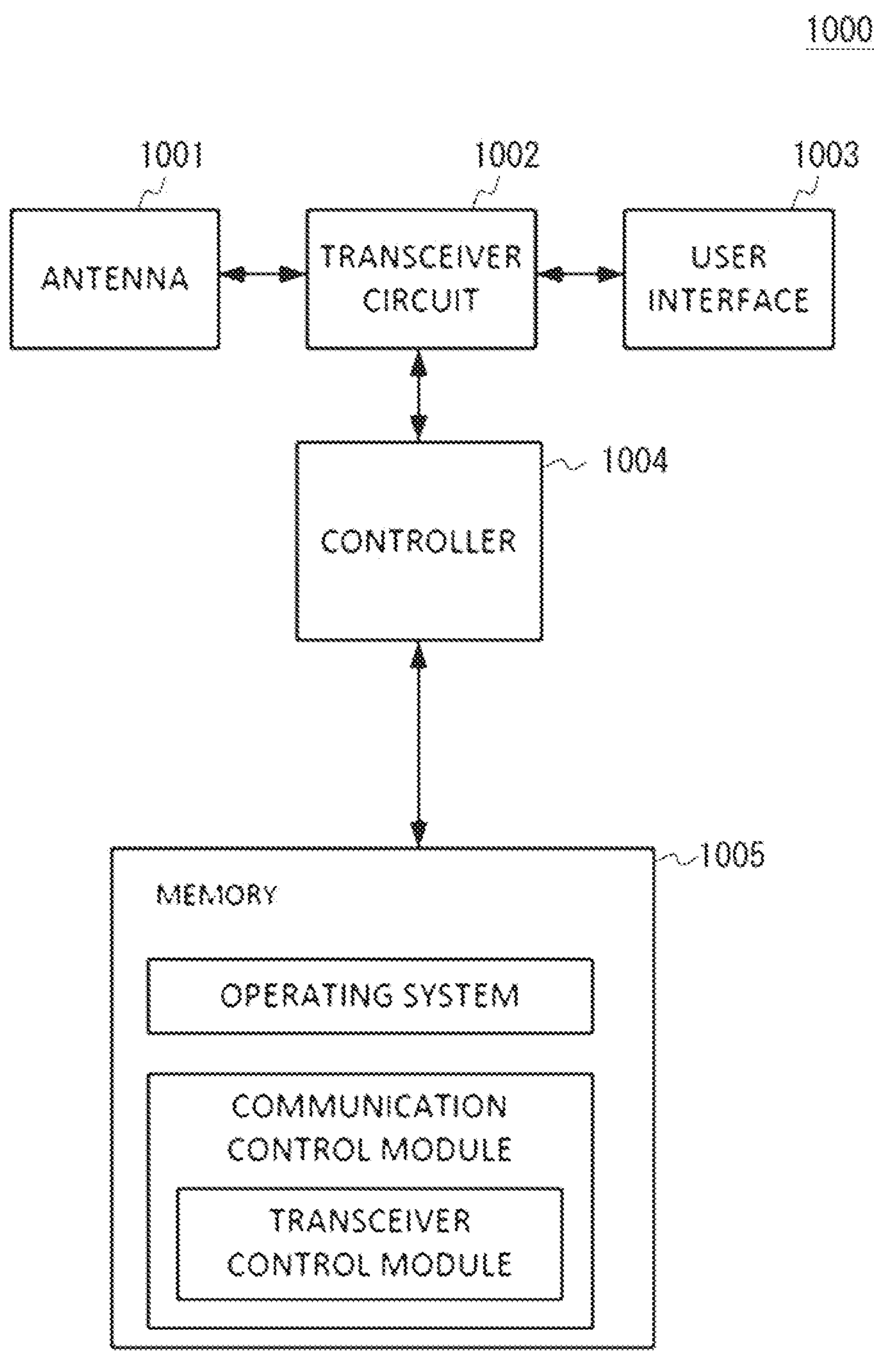
FIG. 10 is a block diagram schematically illustrating a UE.

FIG. 10 is a block diagram illustrating the main components of the UE (1000). As shown, the UE (1000) includes a transceiver circuit (1002) which is operable to transmit signals to and to receive signals from the connected node(s) via one or more antenna (1001). Although not necessarily shown in FIG. 10, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller (1004) controls the operation of the UE in accordance with software stored in a memory (1005). The software includes, among other things, an operating system and a communications control module having at least a transceiver control module. The communications control module (using its transceiver control sub-module) is responsible for handling (generating/sending/receiving) signalling and uplink/downlink data packets between the UE and other nodes, such as the base station/(R)AN node, the MME, the AMF (and other core network nodes). Such signalling may include, for example, appropriately formatted signalling messages relating to connection establishment and maintenance (e.g. RRC connection establishment and other RRC messages), periodic location update related messages (e.g. tracking area update, paging area updates, location area update) etc. Such signalling may also include, for example, broadcast information (e.g. Master Information and System information) in a receiving case.

<(R)AN Node>

Figure 11:
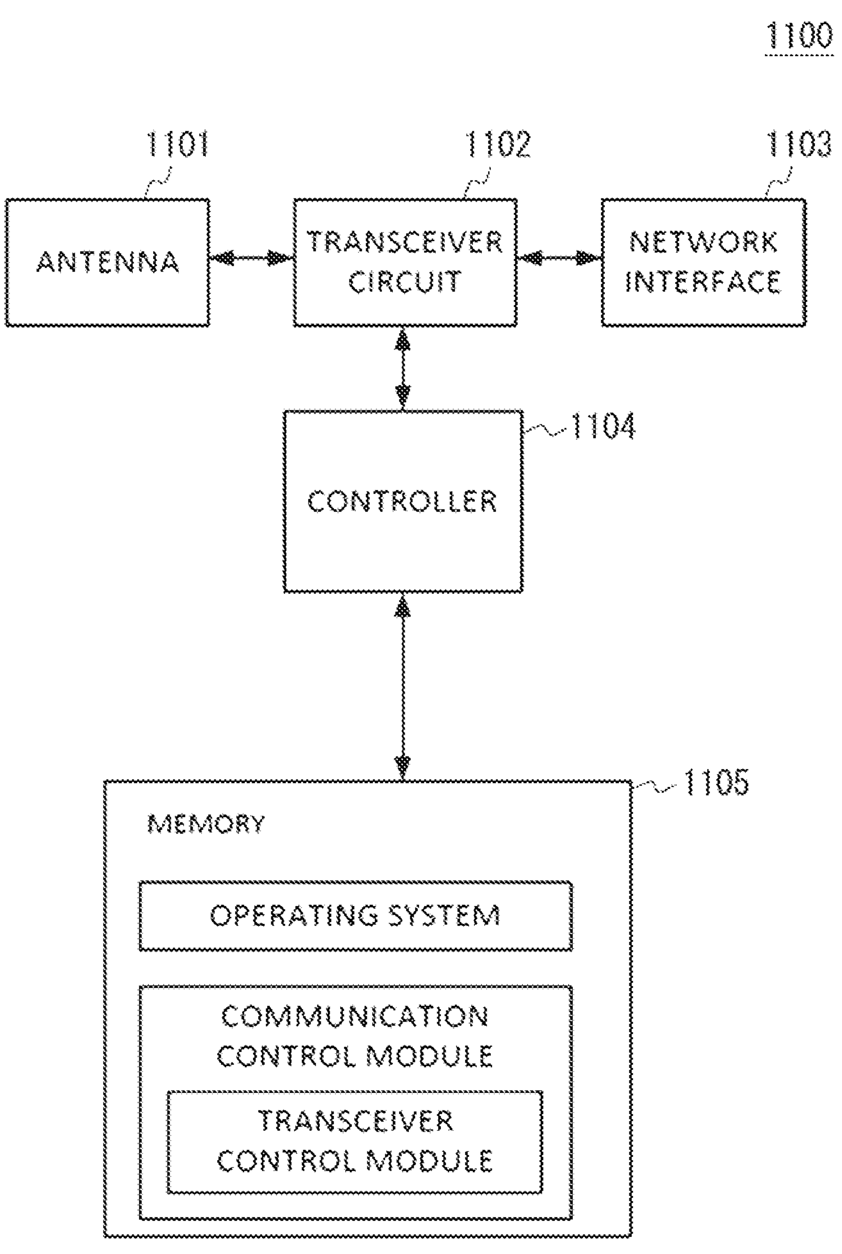
FIG. 11 is a block diagram schematically illustrating a (R)AN.

FIG. 11 is a block diagram illustrating the main components of an exemplary (R)AN node (1100), for example a base station ('eNB' in LTE, 'gNB' in 5G). As shown, the (R)AN node includes a transceiver circuit (1102) which is operable to transmit signals to and to receive signals from connected UE(s) via one or more antenna (1101) and to transmit signals to and to receive signals from other network nodes (either directly or indirectly) via a network interface (1103). A controller (1104) controls the operation of the (R)AN node in accordance with software stored in a memory (1105). Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

<AMF>

Figure 12:
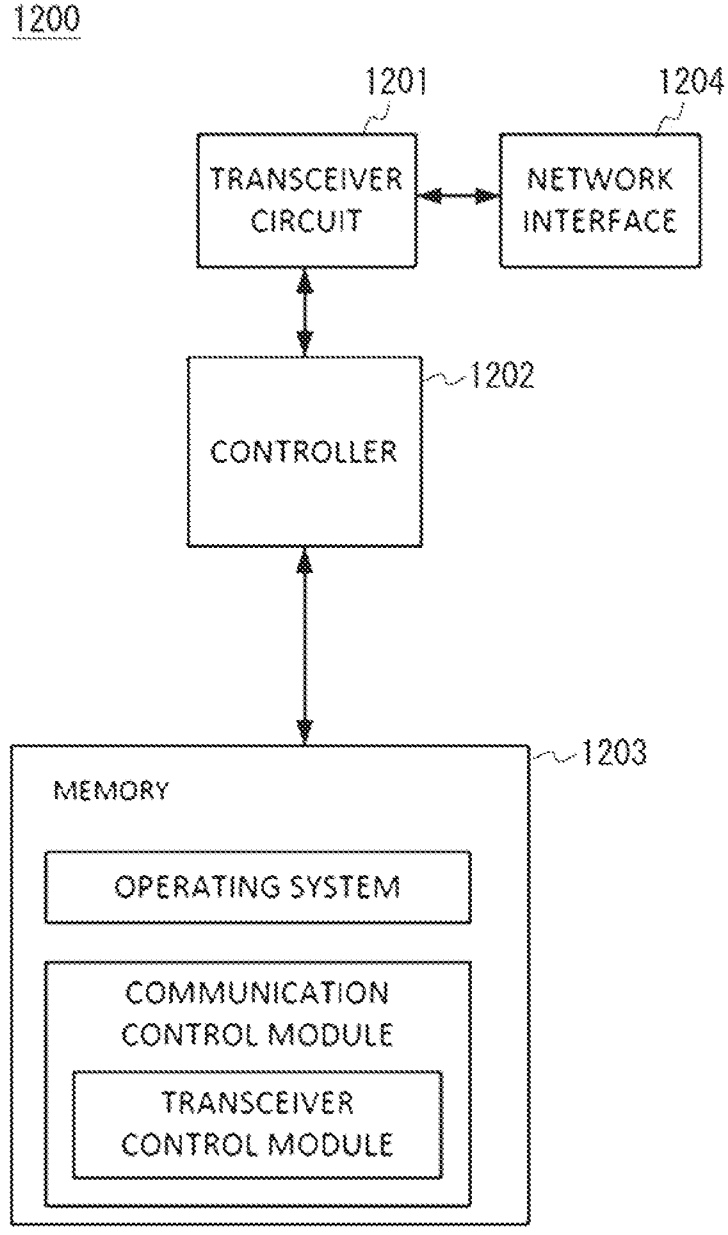
FIG. 12 is a block diagram schematically illustrating a AMF.

FIG. 12 is a block diagram illustrating the main components of the AMF (1200). The AMF is included in the 5GC (5G Core Network). As shown, the AMF (1200) includes a transceiver circuit (1201) which is operable to transmit signals to and to receive signals from other nodes (including the UE) via a network interface (1204). A controller (1202) controls the operation of the AMF (1200) in accordance with software stored in a memory (1203). Software may be pre-installed in the memory (1203) and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the AMF and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The User Equipment (or "UE", "mobile station", "mobile device" or "wireless device") in the present disclosure is an entity connected to a network via a wireless interface. It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "UE" and "wireless device" also encompass devices that remain stationary for a long period of time.

The UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

The UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.). A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the Table 1 (source: 3GPP TS 22.368, Annex B, the contents of which are incorporated herein by reference). This list is not exhaustive and is intended to be indicative of some examples of machine type communication applications.

TABLE 1

Some examples of machine type communication applications.

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/ Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc. Further, the above-described UE categories are merely examples of applications of the technical ideas and exemplary embodiments described in the present document. Needless to say, these technical ideas and embodiments are not limited to the above-described UE and various modifications can be made thereto.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by this document. For example, the embodiments above are not limited to 5GS, and the embodiments are also applicable to communication system other than 5GS.

The whole or part of the example embodiments disclosed above can be described as, but not limited to, the following supplementary notes.

Supplementary Note 1.

A method of a user equipment (UE) which stores a first key, the method comprising:

calculating a second key;

sending an Authentication Response message;

starting a timer based on the sending the Authentication Response message;

deleting the first key in a case where the UE does not receive a Authentication Reject message and the timer expires;

making the second key as valid in a case where the UE does not receive a Authentication Reject message and the timer expires;

deleting the second key in a case where the UE receives the Authentication Reject message while the timer is running; and making the first key as valid in a case where the UE receives the Authentication Reject message while the timer is running.

Supplementary Note 2.

The method according to supplementary note 1, further comprising:

using the first key and the second key for a predetermined process in a case where the timer is running and the predetermined process is performed.

Supplementary Note 3.

The method according to supplementary note 2, further comprising:

deleting the first key in a case where a security check of the predetermined process is passed by using the second key;

making the second key as valid in a case where the security check is passed by using the second key;

deleting the second key in a case where the security check is passed by using the first key; and making the first key as valid in a case where the security check is passed by using the first key.

Supplementary Note 4.

A method of a user equipment (UE), the method comprising:

sending first information to a network apparatus, wherein the first information indicates that the UE supports of receiving a message;

calculating a first key;

receiving second information from the network apparatus, wherein the second information indicates that the network apparatus supports of sending the message;

calculating a second key;

sending a Authentication Response message;

receiving the message in a case where the UE supports of receiving the message;

deleting the first key in a case where the message is received; and making the second key as valid in a case where the message is received.

Supplementary Note 5.

A method of a network apparatus, the method comprising:

receiving first information from a user equipment (UE), wherein the first information indicates that the UE supports of receiving a message;

sending second information to the UE, wherein the second information indicates that the network apparatus supports of sending the message;

receiving an Authentication Response message; and sending the message to indicate validity of a key in a case where the UE supports of receiving the message.

Supplementary Note 6.

A user equipment (UE) which stores a first key, the UE comprising:

means for calculating a second key;

means for sending an Authentication Response message;

means for starting a timer based on the sending the Authentication Response message;

means for deleting the first key in a case where the UE does not receive a Authentication Reject message and the timer expires;

means for making the second key as valid in a case where the UE does not receive a Authentication Reject message and the timer expires;

means for deleting the second key in a case where the UE receives the Authentication Reject message while the timer is running; and means for making the first key as valid in a case where the UE receives the Authentication Reject message while the timer is running.

Supplementary Note 7.

The UE according to supplementary note 6, further comprising:

means for using the first key and the second key for a predetermined process in a case where the timer is running and the predetermined process is performed.

Supplementary Note 8.

The UE according to supplementary note 7, further comprising:

means for deleting the first key in a case where a security check of the predetermined process is passed by using the second key;

means for making the second key as valid in a case where the security check is passed by using the second key;

means for deleting the second key in a case where the security check is passed by using the first key; and means for making the first key as valid in a case where the security check is passed by using the first key.

Supplementary Note 9.

A user equipment (UE), the UE comprising:

means for sending first information to a network apparatus, wherein the first information indicates that the UE supports of receiving a message;

means for calculating a first key;

means for receiving second information from the network apparatus, wherein the second information indicates that the network apparatus supports of sending the message;

means for calculating a second key;

means for sending an Authentication Response message;

means for receiving the message in a case where the UE supports of receiving the message;

means for deleting the first key in a case where the message is received; and means for making the second key as valid in a case where the message is received.

Supplementary Note 10.

A network apparatus comprising:

means for receiving first information from a user equipment (UE), wherein the first information indicates that the UE supports of receiving a message;

means for sending second information to the UE, wherein the second information indicates that the network apparatus supports of sending the message;

means for receiving an Authentication Response message; and means for sending the message to indicate validity of a key in a case where the UE supports of receiving the message.

Supplementary Note 11.

A method of a user equipment (UE), the method comprising:

calculating a key;

sending an Authentication Response message;

starting a timer based on the sending the Authentication Response message;

making the key as valid in a case where the UE does not receive a Authentication Reject message and the timer expires; and deleting the key in a case where the UE receives the Authentication Reject message while the timer is running.

Supplementary Note 12.

The method according to supplementary note 11, further comprising:

using the key for a predetermined process in a case where the timer is running and the predetermined process is performed.

Supplementary Note 13.

The method according to supplementary note 12, further comprising:

deleting the key in a case where a security check of the predetermined process is not passed by using the key; and making the key as valid in a case where the security check is passed by using the key.

Supplementary Note 14.

A method of a user equipment (UE), the method comprising:

sending first information to a network apparatus, wherein the first information indicates that the UE supports of receiving a message;

calculating a key;

receiving second information from the network apparatus, wherein the second information indicates that the network apparatus supports of sending the message;

sending an Authentication Response message;

receiving the message in a case where the UE supports of receiving the message; and making the key as valid in a case where the message is received.

Supplementary Note 15.

A user equipment (UE) comprising:

means for calculating a key;

means for sending an Authentication Response message;

means for starting a timer based on the sending the Authentication Response message;

means for making the key as valid in a case where the UE does not receive a Authentication Reject message and the timer expires; and means for deleting the key in a case where the UE receives the Authentication Reject message while the timer is running.

Supplementary Note 16.

The UE according to supplementary note 15, further comprising:

means for using the key for a predetermined process in a case where the timer is running and the predetermined process is performed.

Supplementary Note 17.

The UE according to supplementary note 16, further comprising:

means for deleting the key in a case where a security check of the predetermined process is not passed by using the key; and means for making the key as valid in a case where the security check is passed by using the key.

Supplementary Note 18.

A user equipment (UE) comprising:

means for sending first information to a network apparatus, wherein the first information indicates that the UE supports of receiving a message;

means for calculating a key;

means for receiving second information from the network apparatus, wherein the second information indicates that the network apparatus supports of sending the message;

means for sending an Authentication Response message;

means for receiving the message in a case where the UE supports of receiving the message; and means for making the key as valid in a case where the message is received.

Supplementary Note 19.

A method of a user equipment (UE) which stores a first key, the method comprising:

calculating a second key during an Authentication procedure;

sending an Authentication Response message;

detecting a radio link failure;

sending a message to indicate that the Authentication procedure is not completed in a case where the radio link failure is detected;

performing the Authentication procedure;

deleting the first key in a case where the Authentication procedure is completed; and making the second key as valid in a case where the Authentication procedure is completed.

Supplementary Note 20.

A method of a user equipment (UE) which stores a first key, the method comprising:

calculating a second key during an Authentication procedure;

sending an Authentication Response message;

detecting a radio link failure;

sending a first message to indicate that the Authentication procedure is not completed in a case where the radio link failure is detected;

receiving a second message to indicate whether the first key or the second key is valid;

deleting the first key in a case where the second message indicates that the second key is valid;

making the second key as valid in a case where the second message indicates that the second key is valid;

deleting the second key in a case where the second message indicates that the first key is valid; and making the first key as valid in a case where the second message indicates that the first key is valid.

Supplementary Note 21.

The method according to supplementary note 20, wherein the first message includes a list, wherein the list includes the first key and the second key, further comprising:

receiving a third message to indicate whether the first key or the second key is valid in a case where the first message includes the list;

deleting the first key in a case where the third message indicates that the second key is valid;

making the second key as valid in a case where the third message indicates that the second key is valid;

deleting the second key in a case where the third message indicates that the first key is valid; and making the first key as valid in a case where the third message indicates that the first key is valid.

Supplementary Note 22.

The method according to supplementary note 20, wherein the first message includes a list, wherein the list includes first information related to the first key and second information related to the second key, further comprising:

receiving a third message to indicate either the first information or the second information in a case where the first message includes the list;

deleting the first key in a case where the third message indicates the second information;

making the second key as valid in a case where the third message indicates the second information;

deleting the second key in a case where the third message indicates the first information; and making the first key as valid in a case where the third message indicates the first information.

Supplementary Note 23.

A method of a user equipment (UE) which stores a first key, the method comprising:

calculating a second key during a first Authentication procedure;

sending an Authentication Response message;

starting a timer based on the sending the Authentication Response message;

sending a first message to indicate that the first Authentication procedure is not completed in a case where the timer expires;

performing a second Authentication procedure;

deleting the first key in a case where the second Authentication procedure is completed; and making the second key as valid in a case where the second Authentication procedure is completed.

Supplementary Note 24.

A method of an Access and Mobility Management Function (AMF), the method comprising:

performing a first Authentication procedure;

receiving a message to indicate that the first Authentication procedure is not completed; and performing a second Authentication procedure to indicate validity of a key in a case where the message is received.

Supplementary Note 25.

A method of an Access and Mobility Management Function (AMF), the method comprising:

performing a procedure for an authentication;

sending, during the procedure, a first message to indicate validity of a key; receiving a second message to indicate that the procedure is not completed; and sending the first message in a case where the second message is received.

Supplementary Note 26.

A method of a user equipment (UE) which stores a first key, the method comprising:

calculating a second key;

performing a first process based on the first key;

making the first key as valid in a case where the first process based on the first key is completed;

deleting the second key in a case where the first process based on the first key is completed;

performing a second process based on the second key;

making the second key as valid in a case where the second process based on the second key is completed; and deleting the first key in a case where the second process based on the second key is completed.

Supplementary Note 27.

A method of a user equipment (UE) which stores a first key, the method comprising:

receiving a first Authentication Request message;

calculating a second key;

receiving a second Authentication Request message;

sending an Authentication Response message;

receiving a message to indicate validity of the second key;

making the second key as valid in a case where the message is received; and deleting the first key in a case where the message is received.

Supplementary Note 28.

A method of an Access and Mobility Management Function (AMF), the method comprising:

sending a first Authentication Request message;

starting a timer based on the sending the first Authentication Request message;

sending a second Authentication Request message in a case where the timer expires;

receiving an Authentication Response message; and sending a message to indicate validity of a key.

Supplementary Note 29.

The method according to supplementary note 28, further comprising:

detecting a radio link failure; and sending the second Authentication Request message in a case where the radio link failure is detected while the timer is running.

Supplementary Note 30.

A method of a user equipment (UE) which stores a first key, the method comprising:

receiving a first Authentication Request message during a first Authentication procedure;

calculating a second key;

performing a second Authentication procedure; and making a third key as valid in a case where the second Authentication procedure is completed, wherein the third key is created in the second Authentication procedure.

Supplementary Note 31.

A method of an Access and Mobility Management Function (AMF), the method comprising:

sending an Authentication Request message during a first Authentication procedure;

starting a timer based on the sending the Authentication Request message; and performing a second Authentication procedure to indicate validity of a key in a case where the timer expires.

Supplementary Note 32.

A user equipment (UE) which stores a first key, the UE comprising:

means for calculating a second key during an Authentication procedure;

means for sending an Authentication Response message;

means for detecting a radio link failure;

means for sending a message to indicate that the Authentication procedure is not completed in a case where the radio link failure is detected;

means for performing the Authentication procedure;

means for deleting the first key in a case where the Authentication procedure is completed; and means for making the second key as valid in a case where the Authentication procedure is completed.

Supplementary Note 33.

A user equipment (UE) which stores a first key, the UE comprising:

means for calculating a second key during an Authentication procedure;

means for sending an Authentication Response message;

means for detecting a radio link failure;

means for sending a first message to indicate that the Authentication procedure is not completed in a case where the radio link failure is detected;

means for receiving a second message to indicate whether the first key or the second key is valid;

means for deleting the first key in a case where the second message indicates that the second key is valid;

means for making the second key as valid in a case where the second message indicates that the second key is valid;

means for deleting the second key in a case where the second message indicates that the first key is valid; and means for making the first key as valid in a case where the second message indicates that the first key is valid.

Supplementary Note 34.

The UE according to supplementary note 33, wherein the first message includes a list, wherein the list includes the first key and the second key, further comprising:

means for receiving a third message to indicate whether the first key or the second key is valid in a case where the first message includes the list;

means for deleting the first key in a case where the third message indicates that the second key is valid;

means for making the second key as valid in a case where the third message indicates that the second key is valid;

means for deleting the second key in a case where the third message indicates that the first key is valid; and means for making the first key as valid in a case where the third message indicates that the first key is valid.

Supplementary Note 35.

The UE according to supplementary note 33, wherein the first message includes a list, wherein the list includes first information related to the first key and second information related to the second key, further comprising:

means for receiving a third message to indicate either the first information or the second information in a case where the first message includes the list;

means for deleting the first key in a case where the third message indicates the second information;

means for making the second key as valid in a case where the third message indicates the second information;

means for deleting the second key in a case where the third message indicates the first information; and means for making the first key as valid in a case where the third message indicates the first information.

Supplementary Note 36.

A user equipment (UE) which stores a first key, the UE comprising:

means for calculating a second key during a first Authentication procedure;

means for sending an Authentication Response message;

means for starting a timer based on the sending the Authentication Response message;

means for sending a first message to indicate that the first Authentication procedure is not completed in a case where the timer expires;

means for performing a second Authentication procedure;

means for deleting the first key in a case where the second Authentication procedure is completed; and means for making the second key as valid in a case where the second Authentication procedure is completed.

Supplementary Note 37.

An Access and Mobility Management Function (AMF) comprising:

means for performing a first Authentication procedure;

means for receiving a message to indicate that the first Authentication procedure is not completed; and means for performing a second Authentication procedure to indicate validity of a key in a case where the message is received.

Supplementary Note 38.

An Access and Mobility Management Function (AMF) comprising:

means for performing a procedure for an authentication;

means for sending, during the procedure, a first message to indicate validity of a key;

means for receiving a second message to indicate that the procedure is not completed; and means for sending the first message in a case where the second message is received.

Supplementary Note 39.

A user equipment (UE) which stores a first key, the UE comprising:

means for calculating a second key;

means for performing a first process based on the first key;

means for making the first key as valid in a case where the first process based on the first key is completed;

means for deleting the second key in a case where the first process based on the first key is completed;

means for performing a second process based on the second key;

means for making the second key as valid in a case where the second process based on the second key is completed; and means for deleting the first key in a case where the second process based on the second key is completed.

Supplementary Note 40.

A user equipment (UE) which stores a first key, the UE comprising:

means for receiving a first Authentication Request message;

means for calculating a second key;

means for receiving a second Authentication Request message;

means for sending an Authentication Response message;

means for receiving a message to indicate validity of the second key;

means for making the second key as valid in a case where the message is received; and means for deleting the first key in a case where the message is received.

Supplementary Note 41.

An Access and Mobility Management Function (AMF) comprising:

means for sending a first Authentication Request message;

means for starting a timer based on the sending the first Authentication Request message;

means for sending a second Authentication Request message in a case where the timer expires;

means for receiving an Authentication Response message; and means for sending a message to indicate validity of a key.

Supplementary Note 42.

The AMF according to supplementary note 41, further comprising:

means for detecting a radio link failure; and means for sending the second Authentication Request message in a case where the radio link failure is detected while the timer is running.

Supplementary Note 43.

A user equipment (UE) which stores a first key, the UE comprising:

means for receiving a first Authentication Request message during a first Authentication procedure;

means for calculating a second key;

means for performing a second Authentication procedure; and means for making a third key as valid in a case where the second Authentication procedure is completed, wherein the third key is created in the second Authentication procedure.

Supplementary Note 44.

An Access and Mobility Management Function (AMF) comprising:

means for sending an Authentication Request message during a first Authentication procedure;

means for starting a timer based on the sending the Authentication Request message; and means for performing a second Authentication procedure to indicate validity of a key in a case where the timer expires.

Supplementary Note 45.

A method of a user equipment (UE), the method comprising:

calculating a key during an Authentication procedure;

sending an Authentication Response message;

detecting a radio link failure;

sending a first message to indicate that the Authentication procedure is not completed in a case where the radio link failure is detected;

performing the Authentication procedure; and making the key as valid in a case where the Authentication procedure is completed.

Supplementary Note 46.

A method of a user equipment (UE), the method comprising:

calculating a key during an Authentication procedure;

sending an Authentication Response message;

detecting a radio link failure;

sending a first message to indicate that the Authentication procedure is not completed in a case where the radio link failure is detected;

receiving a second message to indicate whether the key is valid or not;

deleting the key in a case where the second message indicates that the key is not valid; and making the key as valid in a case where the second message indicates that the key is valid.

Supplementary Note 47.

The method according to supplementary note 46, wherein the first message includes the key, further comprising:

receiving a third message to indicate whether the key is valid or not in a case where the first message includes the key;

deleting the key in a case where the third message indicates that the key is not valid; and making the key as valid in a case where the third message indicates that the key is valid.

Supplementary Note 48.

The method according to supplementary note 46, wherein the first message includes information related to the key, further comprising:

receiving a third message to indicate the information;

deleting the key in a case where the third message does not indicate the information; and making the key as valid in a case where the third message indicates the information.

Supplementary Note 49.

A method of a user equipment (UE), the method comprising:

calculating a first key during a first Authentication procedure;

sending an Authentication Response message;

starting a timer based on the sending the Authentication Response message;

sending a first message to indicate that the first Authentication procedure is not completed in a case where the timer expires;

performing a second Authentication procedure; and making a second key as valid in a case where the second Authentication procedure is completed, wherein the second key is created in the second Authentication procedure.

Supplementary Note 50.

A method of a user equipment (UE), the method comprising:

calculating a key;

performing a process based on the key;

making the key as valid in a case where the process based on the key is completed; and deleting the key in a case where the process based on the key is completed.

Supplementary Note 51.

A method of a user equipment (UE), the method comprising:

receiving a first Authentication Request message;

calculating a key;

sending a first Authentication Response message;

receiving a second Authentication Request message;

sending a second Authentication Response message;

receiving a message to indicate validity of the key; and making the key as valid in a case where the message is received.

Supplementary Note 52.

A method of a user equipment (UE), the method comprising:

receiving a first Authentication Request message during a first Authentication procedure;

calculating a first key;

performing a second Authentication procedure; and making a second key as valid in a case where the second Authentication procedure is completed, wherein the second key is created in the second Authentication procedure.

Supplementary Note 53.

A user equipment (UE) comprising:

means for calculating a key during an Authentication procedure;

means for sending an Authentication Response message;

means for detecting a radio link failure;

means for sending a first message to indicate that the Authentication procedure is not completed in a case where the radio link failure is detected;

means for performing the Authentication procedure; and means for making the key as valid in a case where the Authentication procedure is completed.

Supplementary Note 54.

A user equipment (UE) comprising:

means for calculating a key during an Authentication procedure;

means for sending an Authentication Response message;

means for detecting a radio link failure;

means for sending a first message to indicate that the Authentication procedure is not completed in a case where the radio link failure is detected;

means for receiving a second message to indicate whether the key is valid or not;

means for deleting the key in a case where the second message indicates that the key is not valid; and means for making the key as valid in a case where the second message indicates that the key is valid.

Supplementary Note 55.

The UE according to supplementary note 54, wherein the first message includes the key, further comprising:

means for receiving a third message to indicate whether the key is valid or not in a case where the first message includes the key;

means for deleting the key in a case where the third message indicates that the key is not valid; and means for making the key as valid in a case where the third message indicates that the key is valid.

Supplementary Note 56.

The UE according to supplementary note 54, wherein the first message includes information related to the key, further comprising:

means for receiving a third message to indicate the information;

means for deleting the key in a case where the third message does not indicate the information; and means for making the key as valid in a case where the third message indicates the information.

Supplementary Note 57.

A user equipment (UE) comprising:

means for calculating a first key during a first Authentication procedure;

means for sending an Authentication Response message;

means for starting a timer based on the sending the Authentication Response message;

means for sending a first message to indicate that the first Authentication procedure is not completed in a case where the timer expires;

means for performing a second Authentication procedure; and means for making a second key as valid in a case where the second Authentication procedure is completed, wherein the second key is created in the second Authentication procedure.

Supplementary Note 58.

A user equipment (UE) comprising:

means for calculating a key;

means for performing a process based on the key;

means for making the key as valid in a case where the process based on the key is completed; and means for deleting the key in a case where the process based on the key is completed.

Supplementary Note 59.

A user equipment (UE), the UE comprising:

means for receiving a first Authentication Request message;

means for calculating a key;

means for sending a first Authentication Response message;

means for receiving a second Authentication Request message;

means for sending a second Authentication Response message;

means for receiving a message to indicate validity of the key; and means for making the key as valid in a case where the message is received.

Supplementary Note 60.

A user equipment (UE) comprising:

means for receiving a first Authentication Request message during a first Authentication procedure;

means for calculating a first key;

means for performing a second Authentication procedure; and means for making a second key as valid in a case where the second Authentication procedure is completed, wherein the second key is created in the second Authentication procedure.

The whole or part of the example embodiments disclosed above can be described as, but not limited to, the following.

3GPP TS 33.501v 16.4.0

6.1.2 Initiation of Authentication and Selection of Authentication Method

Figure 13:
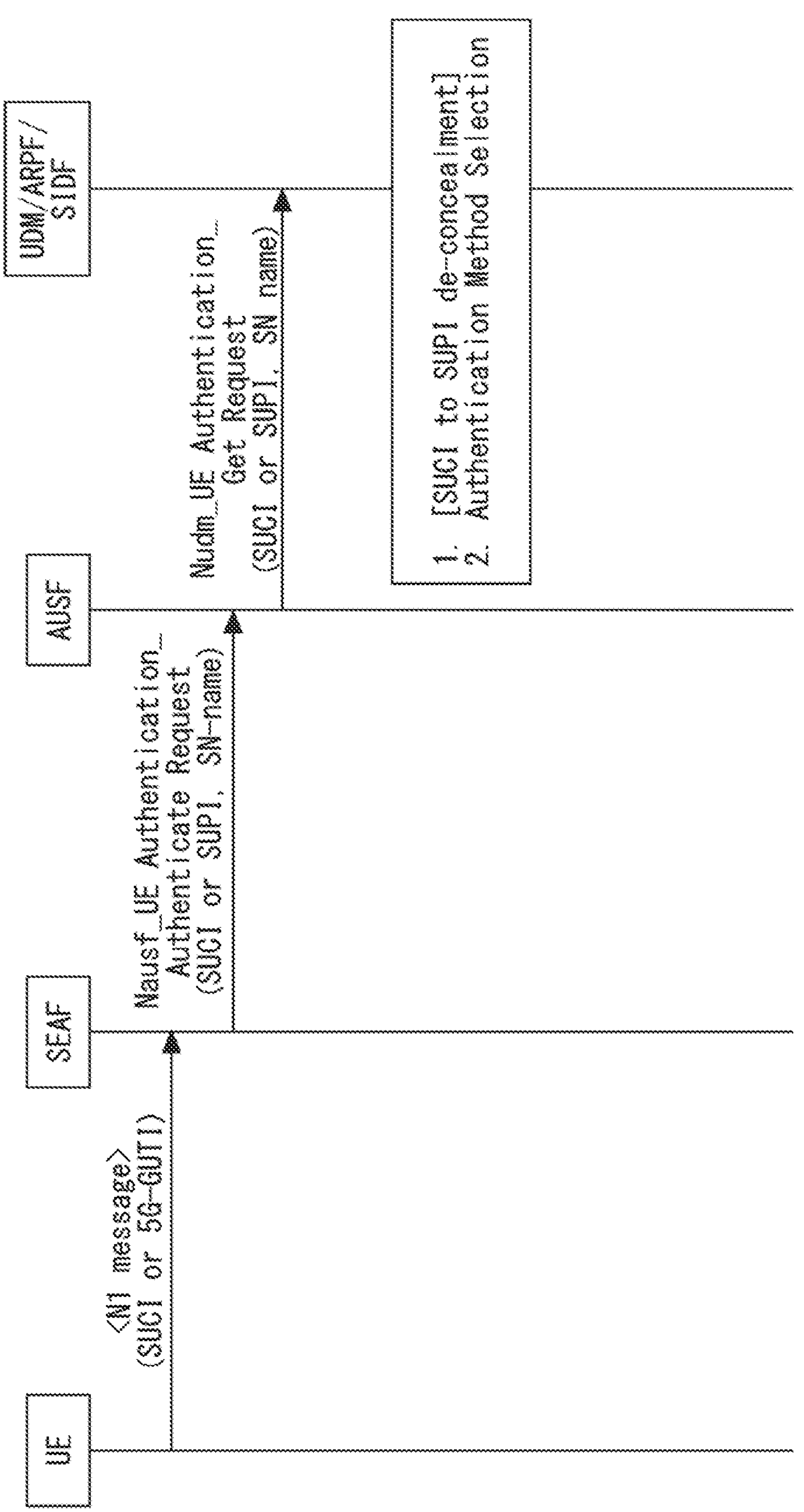
FIG. 13 is a diagram of Initiation of authentication procedure and selection of authentication method.

The initiation of the primary authentication is shown in FIG. 6.1.2-1 (See FIG. 13 of the present application.).

The SEAF may initiate an authentication with the UE during any procedure establishing a signalling connection with the UE, according to the SEAF's policy.

The UE shall use SUCI or 5G-GUTI in the Registration Request. If the UE supports reception of the Authentication Result message, then the UE shall include a capability indicating it supports reception of the Authentication Result. The SEAF shall invoke the Nausf_UEAuthentication service by sending a Nausf_UEAuthentication_Authenticate Request message to the AUSF whenever the SEAF wishes to initiate an authentication.

The Nausf_UEAuthentication_Authenticate Request message shall contain either:

SUCI, as defined in the current specification, or

SUPI, as defined in TS 23.501 [2].

The SEAF shall include the SUPI in the Nausf_UEAuthentication_Authenticate Request message in case the SEAF has a valid 5G-GUTI and re-authenticates the UE. Otherwise the SUCI is included in Nausf_UEAuthentication_Authenticate Request. SUPI/SUCI structure is part of stage 3 protocol design.

The Nausf_UEAuthentication_Authenticate Request shall furthermore contain:

the serving network name, as defined in sub-clause 6.1.1.4 of the present document.

NOTE 2: The local policy for the selection of the authentication method does not need to be on a per-UE basis, but can be the same for all UEs.

Upon receiving the Nausf_UEAuthentication_Authenticate Request message, the AUSF shall check that the requesting SEAF in the serving network is entitled to use the serving network name in the Nausf_UEAuthentication_Authenticate Request by comparing the serving network name with the expected serving network name. The AUSF shall store the received serving network name temporarily. If the serving network is not authorized to use the serving network name, the AUSF shall respond with "serving network not authorized" in the Nausf_UEAuthentication_Authenticate Response.

The Nudm_UEAuthentication_Get Request sent from AUSF to UDM includes the following information:

SUCI or SUPI;

the serving network name;

Upon reception of the Nudm_UEAuthentication_Get Request, the UDM shall invoke SIDF if a SUCI is received. SIDF shall de-conceal SUCI to gain SUPI before UDM can process the request.

Based on SUPI, the UDM/ARPF shall choose the authentication method.

NOTE 3: The Nudm_UEAuthentication_Get Response in reply to the Nudm_UEAuthentication_Get Request and the Nausf_UEAuthentication_Authenticate Response message in reply to the Nausf_UEAuthentication_Authenticate Request message are described as part of the authentication procedures in clause 6.1.3.

3GPP TS 33.501v 16.4.0

6.1.3.2.0 5G AKA

5G AKA enhances EPS AKA [10] by providing the home network with proof of successful authentication of the UE from the visited network. The proof is sent by the visited network in an Authentication Confirmation message.

The selection of using 5G AKA is described in sub-clause 6.1.2 of the present document.

NOTE 1: 5G AKA does not support requesting multiple 5G AVs, neither the SEAF pre-fetching 5G AVs from the home network for future use.

Figure 14:
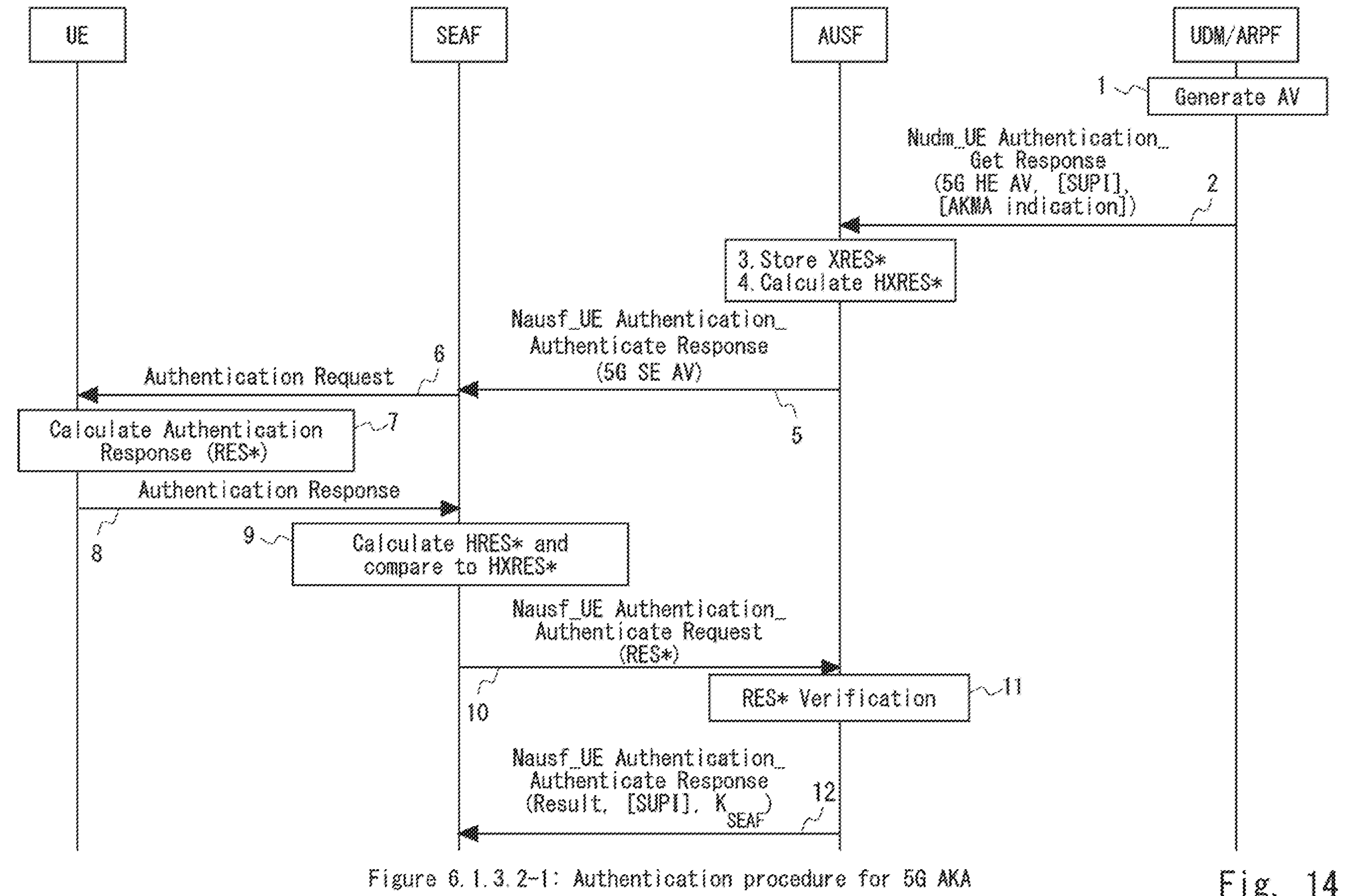
FIG. 14 is a diagram of Authentication procedure for 5G AKA.

FIG. 6.1.3.2-1: Authentication procedure for 5G AKA (See FIG. 14 of the present application.)

The authentication procedure for 5G AKA works as follows, cf. also FIG. 6.1.3.2-1 (See FIG. 14 of the present application.):

1. For each Nudm_Authenticate_Get Request, the UDM/ARPF shall create a 5G HE AV. The UDM/ARPF does this by generating an AV with the Authentication Management Field (AMF) separation bit set to "1" as defined in TS 33.102 [9]. The UDM/ARPF shall then derive KAUSF (as per Annex A.2) and calculate XRES* (as per Annex A.4). Finally, the UDM/ARPF shall create a 5G HE AV from RAND, AUTN, XRES*, and $K_{AUSF}$.

2. The UDM shall then return the 5G HE AV to the AUSF together with an indication that the 5G HE AV is to be used for 5G AKA in a Nudm_UEAuthentication_Get Response. In case SUCI was included in the Nudm_UEAuthentication_Get Request, UDM will include the SUPI in the Nudm_UEAuthentication_Get Response after deconcealment of SUCI by SIDF. If a subscriber has an AKMA subscription, the UDM shall include the AKMA indication in the Nudm_UEAuthentication_Get Response.

3. The AUSF shall store the XRES* temporarily together with the received SUCI or SUPI.

4. The AUSF shall then generate the 5G AV from the 5G HE AV received from the UDM/ARPF by computing the HXRES* from XRES* (according to Annex A.5) and KSEAF from KAUSF (according to Annex A.6), and replacing the XRES* with the HXRES* and KAUSF with KSEAF in the 5G HE AV.

5. The AUSF shall then remove the KSEAF and return the 5G SE AV (RAND, AUTN, HXRES*) to the SEAF in a Nausf_UEAuthentication_Authenticate Response.

6. The SEAF shall send RAND, AUTN to the UE in a NAS message Authentication Request. This message shall also include the ngKSI that will be used by the UE and AMF to identify the KAMF and the partial native security context that is created if the authentication is successful. This message shall also include the ABBA parameter. The SEAF shall set the ABBA parameter as defined in Annex A.7.1. The ME shall forward the RAND and AUTN received in NAS message Authentication Request to the USIM.

NOTE 2: The ABBA parameter is included to enable the bidding down protection of security features.

7. At receipt of the RAND and AUTN, the USIM shall verify the freshness of the received values by checking whether AUTN can be accepted as described in TS 33.102 [9]. If so, the USIM computes a response RES. The USIM shall return RES, CK, IK to the ME. If the USIM computes a Kc (i.e. GPRS Kc) from CK and IK using conversion function c3 as described in TS 33.102 [9], and sends it to the ME, then the ME shall ignore such GPRS Kc and not store the GPRS Kc on USIM or in ME. The ME then shall compute RES* from RES according to Annex A.4. The ME shall calculate $K_{AUSF}$ from CK||IK according to clause A.2. The ME shall calculate $K_{SEAF}$ from $K_{AUSF}$ according to clause A.6. An ME accessing 5G shall check during authentication that the "separation bit" in the AMF field of AUTN is set to 1. The "separation bit" is bit 0 of the AMF field of AUTN.

NOTE 3: This separation bit in the AMF field of AUTN cannot be used anymore for operator specific purposes as described by TS 33.102 [9], Annex F.

8. The UE shall return RES* to the SEAF in a NAS message Authentication Response.

9. The SEAF shall then compute HRES* from RES* according to Annex A.5, and the SEAF shall compare HRES* and HXRES*. If they coincide, the SEAF shall consider the authentication successful from the serving network point of view. If not, the SEAF proceed as described in sub-clause 6.1.3.2.2. If the UE is not reached, and the RES* is never received by the SEAF, the SEAF shall consider authentication as failed, and indicate a failure to the AUSF.

10. The SEAF shall send RES*, as received from the UE, in a Nausf_UEAuthentication_Authenticate Request message to the AUSF.

11. When the AUSF receives as authentication confirmation the Nausf_UEAuthentication_Authenticate Request message including a RES* it may verify whether the 5G AV has expired. If the 5G AV has expired, the AUSF may consider the authentication as unsuccessful from the home network point of view. Upon successful authentication, the AUSF shall store the $K_{AUSF}$. AUSF shall compare the received RES* with the stored XRES*. If the RES* and XRES* are equal, the AUSF shall consider the authentication as successful from the home network point of view. AUSF shall inform UDM about the authentication result (see sub-clause 6.1.4 of the present document for linking with the authentication confirmation).

12. The AUSF shall indicate to the SEAF in the Nausf_UEAuthentication_Authenticate Response whether the authentication was successful or not from the home network point of view. If the authentication was successful, the $K_{SEAF}$ shall be sent to the SEAF in the Nausf_UEAuthentication_Authenticate Response. In case the AUSF received a SUCI from the SEAF in the authentication request (see sub-clause 6.1.2 of the present document), and if the authentication was successful, then the AUSF shall also include the SUPI in the Nausf_UEAuthentication_Authenticate Response message.

If the authentication was successful, the key KSEAF received in the Nausf_UEAuthentication_Authenticate Response message shall become the anchor key in the sense of the key hierarchy as specified in sub-clause 6.2 of the present document. Then the SEAF shall derive the KAMF from the KSEAF, the ABBA parameter and the SUPI according to Annex A.7. The SEAF shall provide the ngKSI and the KAMF to the AMF.

If a SUCI was used for this authentication, then the SEAF shall only provide ngKSI and KAMF to the AMF after it has received the Nausf_UEAuthentication_Authenticate Response message containing KSEAF and SUPI; no communication services will be provided to the UE until the SUPI is known to the serving network.

The further steps taken by the AUSF after the authentication procedure are described in sub-clause 6.1.4 of the present document.

3GPP TS 33.501

6.1.3.2.0 5G AKA

5G AKA enhances EPS AKA [10] by providing the home network with proof of successful authentication of the UE from the visited network. The proof is sent by the visited network in an Authentication Confirmation message.

The selection of using 5G AKA is described in sub-clause 6.1.2 of the present document.

NOTE 1: 5G AKA does not support requesting multiple 5G AVs, neither the SEAF pre-fetching 5G AVs from the home network for future use.

Figure 15:
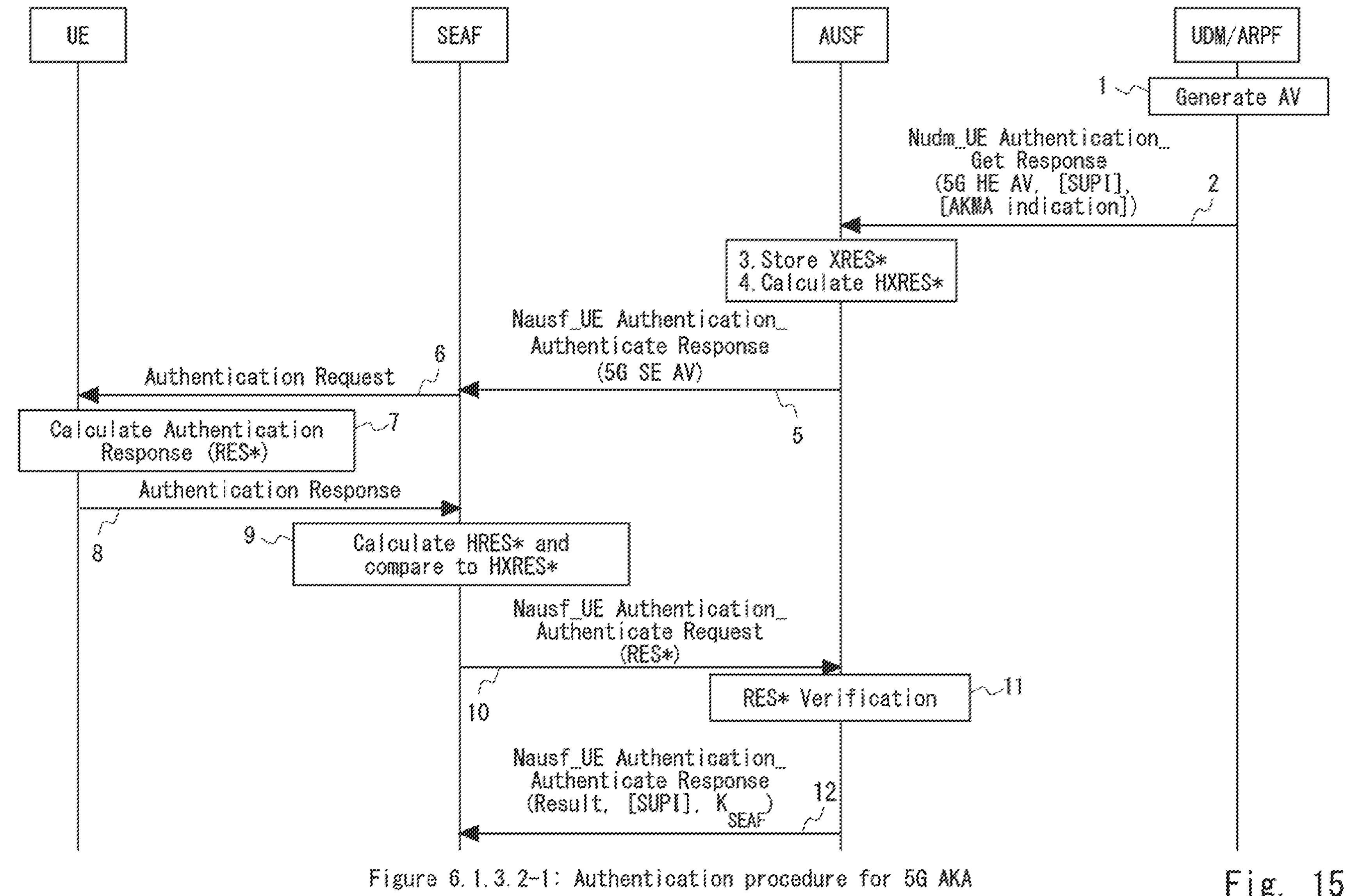
FIG. 15 is a diagram of Authentication procedure for 5G AKA.

FIG. 6.1.3.2-1: Authentication procedure for 5G AKA (See FIG. 15 of the present application.)

The authentication procedure for 5G AKA works as follows, cf. also FIG. 6.1.3.2-1 (See FIG. 15 of the present application.):

1. For each Nudm_Authenticate_Get Request, the UDM/ARPF shall create a 5G HE AV. The UDM/ARPF does this by generating an AV with the Authentication Management Field (AMF) separation bit set to "1" as defined in TS 33.102 [9]. The UDM/ARPF shall then derive KAUSF (as per Annex A.2) and calculate XRES* (as per Annex A.4). Finally, the UDM/ARPF shall create a 5G HE AV from RAND, AUTN, XRES*, and KAUSF.

2. The UDM shall then return the 5G HE AV to the AUSF together with an indication that the 5G HE AV is to be used for 5G AKA in a Nudm_UEAuthentication_Get Response. In case SUCI was included in the Nudm_UEAuthentication_Get Request, UDM will include the SUPI in the Nudm_UEAuthentication_Get Response after deconcealment of SUCI by SIDF. If a subscriber has an AKMA subscription, the UDM shall include the AKMA indication in the Nudm_UEAuthentication_Get Response.

3. The AUSF shall store the XRES* temporarily together with the received SUCI or SUPI.

4. The AUSF shall then generate the 5G AV from the 5G HE AV received from the UDM/ARPF by computing the HXRES* from XRES* (according to Annex A.5) and KSEAF from KAUSF (according to Annex A.6), and replacing the XRES* with the HXRES* and KAUSF with KSEAF in the 5G HE AV.

5. The AUSF shall then remove the KSEAF and return the 5G SE AV (RAND, AUTN, HXRES*) to the SEAF in a Nausf_UEAuthentication_Authenticate Response.

6. The SEAF shall send RAND, AUTN to the UE in a NAS message Authentication Request. This message shall also include the ngKSI that will be used by the UE and AMF to identify the $K_{AMF}$ and the partial native security context that is created if the authentication is successful. This message shall also include the ABBA parameter. The SEAF shall set the ABBA parameter as defined in Annex A.7.1. The ME shall forward the RAND and AUTN received in NAS message Authentication Request to the USIM.

NOTE 2: The ABBA parameter is included to enable the bidding down protection of security features.

7. At receipt of the RAND and AUTN, the USIM shall verify the freshness of the received values by checking whether AUTN can be accepted as described in TS 33.102 [9]. If so, the USIM computes a response RES. The USIM shall return RES, CK, IK to the ME. If the USIM computes a Kc (i.e. GPRS Kc) from CK and IK using conversion function c3 as described in TS 33.102 [9], and sends it to the ME, then the ME shall ignore such GPRS Kc and not store the GPRS Kc on USIM or in ME. The ME then shall compute RES* from RES according to Annex A.4. The ME shall calculate KAUSF from CK||IK according to clause A.2. The ME shall calculate KSEAF from KAUSF according to clause A.6. An ME accessing 5G shall check during authentication that the "separation bit" in the AMF field of AUTN is set to 1. The "separation bit" is bit 0 of the AMF field of AUTN. NOTE 3: This separation bit in the AMF field of AUTN cannot be used anymore for operator specific purposes as described by TS 33.102 [9], Annex F.

8. The UE shall return RES* to the SEAF in a NAS message Authentication Response. The UE shall start a timer T. While the timer T is running the KAUSF created in the step 7 is not considered as latest KAUSF and shall not use the KAUSF in any security related procedure involving KAUSF. When the timer T expires and the UE does not receive any NAS message e.g. Authentication Reject indicating that the authentication procedure was failed, the UE shall make the KAUSF as the latest KAUSF and uses the KAUSF in the subsequent security procedure involving KAUSF. In case the UE encounter radio link failure before the timer expires the UE stops the timer and, the UE shall not use KAUSF. When a next NAS signalling connection is established successfully then UE shall start using the KAUSF and make the KAUSF as the latest KAUSF. When the next NAS signalling connection establishment fails due to the failure of the last authentication procedure (e.g. the UE receives a NAS message from the AMF indicating failure of authentication procedure (5GMM cause #3 illegal UE) the UE shall consider the KAUSF as invalid and the UE shall delete the KAUSF.

9. The SEAF shall then compute HRES* from RES* according to Annex A.5, and the SEAF shall compare HRES* and HXRES*. If they coincide, the SEAF shall consider the authentication successful from the serving network point of view. If not, the SEAF proceed as described in sub-clause 6.1.3.2.2. If the UE is not reached, and the RES* is never received by the SEAF, the SEAF shall consider authentication as failed, and indicate a failure to the AUSF.

10. The SEAF shall send RES*, as received from the UE, in a Nausf_UEAuthentication_Authenticate Request message to the AUSF.

11. When the AUSF receives as authentication confirmation the Nausf_UEAuthentication_Authenticate Request message including a RES* it may verify whether the 5G AV has expired. If the 5G AV has expired, the AUSF may consider the authentication as unsuccessful from the home network point of view. Upon successful authentication, the AUSF shall store the KAUSF. AUSF shall compare the received RES* with the stored XRES*. If the RES* and XRES* are equal, the AUSF shall consider the authentication as successful from the home network point of view. AUSF shall inform UDM about the authentication result (see sub-clause 6.1.4 of the present document for linking with the authentication confirmation).

12. The AUSF shall indicate to the SEAF in the Nausf_UEAuthentication_Authenticate Response whether the authentication was successful or not from the home network point of view. If the authentication was successful, the KSEAF shall be sent to the SEAF in the Nausf_UEAuthentication_Authenticate Response. In case the AUSF received a SUCI from the SEAF in the authentication request (see sub-clause 6.1.2 of the present document), and if the authentication was successful, then the AUSF shall also include the SUPI in the Nausf_UEAuthentication_Authenticate Response message.

If the authentication was successful, the key KSEAF received in the Nausf_UEAuthentication_Authenticate Response message shall become the anchor key in the sense of the key hierarchy as specified in sub-clause 6.2 of the present document. Then the SEAF shall derive the KAMF from the KSEAF, the ABBA parameter and the SUPI according to Annex A.7. The SEAF shall provide the ngKSI and the KAMF to the AMF.

If a SUCI was used for this authentication, then the SEAF shall only provide ngKSI and KAMF to the AMF after it has received the Nausf_UEAuthentication_Authenticate Response message containing KSEAF and SUPI; no communication services will be provided to the UE until the SUPI is known to the serving network.

The further steps taken by the AUSF after the authentication procedure are described in sub-clause 6.1.4 of the present document.

3GPP TS 24.501

5.4.1.3.7 Abnormal Cases a) Lower Layer Failure.

Upon detection of lower layer failure before the AUTHENTICATION RESPONSE message is received, the network shall keep running the timer T3560 if the timer T3560 is running.

b) Expiry of Timer T3560.

The network shall, on the first expiry of the timer T3560, retransmit the AUTHENTICATION REQUEST message and shall reset and start timer T3560. This retransmission is repeated four times, i.e. on the fifth expiry of timer T3560, the network shall abort the 5G AKA based primary authentication and key agreement procedure and any ongoing 5GMM specific procedure and release the N1 NAS signalling connection.

c) Authentication Failure (5GMM Cause #20 "MAC Failure").

The UE shall send an AUTHENTICATION FAILURE message, with 5GMM cause #20 "MAC failure" according to subclause 5.4.1.3.6, to the network and start timer T3520 (see example in FIG. 5.4.1.3.7.1). Furthermore, the UE shall stop any of the retransmission timers that are running (e.g. T3510, T3517 or T3521). Upon the first receipt of an AUTHENTICATION FAILURE message from the UE with 5GMM cause #20 "MAC failure", the network may initiate the identification procedure described in subclause 5.4.3. This is to allow the network to obtain the SUCI from the UE. The network may then check that the 5G-GUTI originally used in the 5G authentication challenge corresponded to the correct SUPI. Upon receipt of the IDENTITY REQUEST message from the network, the UE shall proceed as specified in subclause 5.4.3.3.

NOTE 1: Upon receipt of an AUTHENTICATION FAILURE message from the UE with 5GMM cause #20 "MAC failure", the network may also terminate the 5G AKA based primary authentication and key agreement procedure (see subclause 5.4.1.3.5).

If the mapping of 5G-GUTI to SUPI in the network was incorrect, the network should respond by sending a new AUTHENTICATION REQUEST message to the UE. Upon receiving the new AUTHENTICATION REQUEST message from the network, the UE shall stop the timer T3520, if running, and then process the 5G challenge information as normal. If the mapping of 5G-GUTI to SUPI in the network was correct, the network should terminate the 5G AKA based primary authentication and key agreement procedure by sending an AUTHENTICATION REJECT message (see subclause 5.4.1.3.5).

If the network is validated successfully (an AUTHENTICATION REQUEST message that contains a valid SQN and MAC is received), the UE shall send the AUTHENTICATION RESPONSE message to the network and shall start any retransmission timers (e.g. T3510, T3517 or T3521) if they were running and stopped when the UE received the first failed AUTHENTICATION REQUEST message.

If the UE receives the second AUTHENTICATION REQUEST message, and the MAC value cannot be resolved, the UE shall follow the procedure specified in this subclause, item c, starting again from the beginning, or if the message contains a UMTS authentication challenge, the UE shall follow the procedure specified in item d. If the SQN is invalid, the UE shall proceed as specified in item f.

Figure 16:
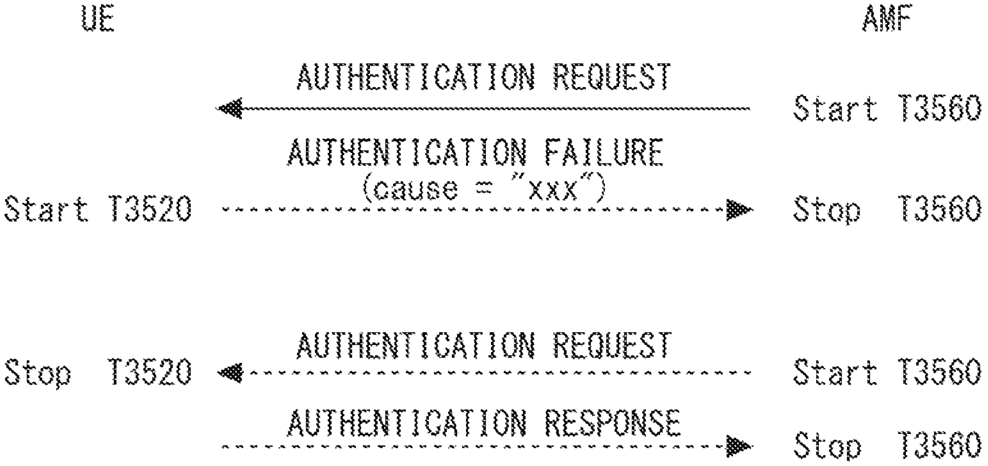
FIG. 16 is a diagram of Authentication failure during 5G AKA based primary authentication and key agreement procedure.

FIG. 5.4.1.3.7.1: Authentication failure during 5G AKA based primary authentication and key agreement procedure (See FIG. 16 of the present application.)

d) Authentication Failure (5GMM Cause #26 "Non-5G Authentication Unacceptable").

The UE shall send an AUTHENTICATION FAILURE message, with 5GMM cause #26 "non-5G authentication unacceptable", to the network and start the timer T3520 (see example in FIG. 5.4.1.3.7.1). Furthermore, the UE shall stop any of the retransmission timers that are running (e.g. T3510, T3517 or T3521).

Upon the first receipt of an AUTHENTICATION FAILURE message from the UE with 5GMM cause #26 "non-5G authentication unacceptable", the network may initiate the identification procedure described in subclause 5.4.3. This is to allow the network to obtain the SUCI from the UE. The network may then check that the 5G-GUTI originally used in the 5G authentication challenge corresponded to the correct SUPI. Upon receipt of the IDENTITY REQUEST message from the network, the UE shall proceed as specified in subclause 5.4.3.3.

NOTE 2: Upon receipt of an AUTHENTICATION FAILURE message from the UE with 5GMM cause #26 "non-5G authentication unacceptable", the network may also terminate the 5G AKA based primary authentication and key agreement procedure (see subclause 5.4.1.3.5).

If the mapping of 5G-GUTI to SUPI in the network was incorrect, the network should respond by sending a new AUTHENTICATION REQUEST message to the UE. Upon receiving the new AUTHENTICATION REQUEST message from the network, the UE shall stop the timer T3520, if running, and then process the 5G challenge information as normal. If the mapping of 5G-GUTI to SUPI in the network was correct, the network should terminate the 5G AKA based primary authentication and key agreement authentication procedure by sending an AUTHENTICATION REJECT message (see subclause 5.4.1.3.5).

If the network is validated successfully (an AUTHENTICATION REQUEST message that contains a valid 5G authentication challenge is received), the UE shall send the AUTHENTICATION RESPONSE message to the network and shall start any retransmission timers (e.g. T3510, T3517 or T3521) if they were running and stopped when the UE received the first failed AUTHENTICATION REQUEST message.

e) Authentication Failure (5GMM Cause #71 "ngKSI Already in Use").

The UE shall send an AUTHENTICATION FAILURE message, with 5GMM cause #71 "ngKSI already in use", to the network and start the timer T3520 (see example in FIG. 5.4.1.3.7.1). Furthermore, the UE shall stop any of the retransmission timers that are running (e.g. T3510, T3517 or T3521). Upon the first receipt of an AUTHENTICATION FAILURE message from the UE with 5GMM cause #71 "ngKSI already in use", the network performs necessary actions to select a new ngKSI and send the same 5G authentication challenge to the UE. NOTE 3: Upon receipt of an AUTHENTICATION FAILURE message from the UE with 5GMM cause #71 "ngKSI already in use", the network may also re-initiate the 5G AKA based primary authentication and key agreement procedure (see subclause 5.4.1.3.2).

Upon receiving the new AUTHENTICATION REQUEST message from the network, the UE shall stop the timer T3520, if running, and then process the 5G challenge information as normal.

If the network is validated successfully (an AUTHENTICATION REQUEST message that contains a valid ngKSI, SQN and MAC is received), the UE shall send the AUTHENTICATION RESPONSE message to the network and shall start any retransmission timers (e.g. T3510, T3517 or T3521) if they were running and stopped when the UE received the first failed AUTHENTICATION REQUEST message.

f) Authentication Failure (5GMM Cause #21 "Synch Failure").

The UE shall send an AUTHENTICATION FAILURE message, with 5GMM cause #21 "synch failure", to the network and start the timer T3520 (see example in FIG. 5.4.1.3.7.1). Furthermore, the UE shall stop any of the retransmission timers that are running (e.g. T3510, T3517 or T3521). Upon the first receipt of an AUTHENTICATION FAILURE message from the UE with the 5GMM cause #21 "synch failure", the network shall use the returned AUTS parameter from the authentication failure parameter IE in the AUTHENTICATION FAILURE message, to re-synchronise. The re-synchronisation procedure requires the AMF to delete all unused authentication vectors for that SUPI and obtain new vectors from the UDM/AUSF. When re-synchronisation is complete, the network shall initiate the 5G AKA based primary authentication and key agreement procedure. Upon receipt of the AUTHENTICATION REQUEST message, the UE shall stop the timer T3520, if running.

NOTE 4: Upon receipt of two consecutive AUTHENTICATION FAILURE messages from the UE with 5GMM cause #21 "synch failure", the network may terminate the 5G AKA based primary authentication and key agreement procedure by sending an AUTHENTICATION REJECT message.

If the network is validated successfully (a new AUTHENTICATION REQUEST message is received which contains a valid SQN and MAC) while T3520 is running, the UE shall send the AUTHENTICATION RESPONSE message to the network and shall start any retransmission timers (e.g. T3510, T3517 or T3521), if they were running and stopped when the UE received the first failed AUTHENTICATION REQUEST message.

Upon receipt of an AUTHENTICATION REJECT message, the UE shall perform the actions as specified in subclause 5.4.1.3.5.

g) Network Failing the Authentication Check.

If the UE deems that the network has failed the authentication check, then it shall request RRC to locally release the RRC connection and treat the active cell as barred (see 3GPP TS 38.304 [28]). The UE shall start any retransmission timers (e.g. T3510, T3517 or T3521), if they were running and stopped when the UE received the first AUTHENTICATION REQUEST message containing an incorrect authentication challenge data causing authentication failure.

h) Transmission failure of AUTHENTICATION RESPONSE message or AUTHENTICATION FAILURE message indication from lower layers (if the 5G AKA based primary authentication and key agreement procedure is triggered by a registration procedure for mobility and periodic registration update).

The UE shall stop the timer T3520, if running, and re-initiate the registration procedure for mobility and periodic registration update.

i) Transmission failure of AUTHENTICATION RESPONSE message or AUTHENTICATION FAILURE message indication with TAI change from lower layers (if the 5G AKA based primary authentication and key agreement procedure is triggered by a service request procedure).

The UE shall stop the timer T3520, if running.

If the current TAI is not in the TAI list, the 5G AKA based primary authentication and key agreement procedure shall be aborted and a registration procedure for mobility and periodic registration update shall be initiated.

If the current TAI is still part of the TAI list, it is up to the UE implementation how to re-run the ongoing procedure that triggered the 5G AKA based primary authentication and key agreement procedure.

j) Transmission failure of AUTHENTICATION RESPONSE message or AUTHENTICATION FAILURE message indication without TAI change from lower layers (if the authentication procedure is triggered by a service request procedure).

The UE shall stop the timer T3520, if running. It is up to the UE implementation how to re-run the ongoing procedure that triggered the 5G AKA based primary authentication and key agreement procedure.

k) Lower Layers Indication of Non-Delivered NAS PDU Due to Handover.

If the AUTHENTICATION REQUEST message could not be delivered due to an intra AMF handover and the target TA is included in the TAI list, then upon successful completion of the intra AMF handover the AMF shall retransmit the AUTHENTICATION REQUEST message. If a failure of handover procedure is reported by the lower layer and the N1 NAS signalling connection exists, the AMF shall retransmit the AUTHENTICATION REQUEST message.

l) Change of Cell into a New Tracking Area.

If a cell change into a new tracking area that is not in the TAI list occurs before the AUTHENTICATION RESPONSE message is sent, the UE may discard sending the AUTHENTICATION RESPONSE message to the network and continue with the initiation of the registration procedure for mobility and periodic registration as described in subclause 5.5.1.3.2.

For items c, d, e, and f whether or not the UE is registered for emergency services:

The UE shall stop timer T3520, if the timer is running and the UE enters 5GMM-IDLE mode, e.g. upon detection of a lower layer failure, release of the N1 NAS signalling connection, or as the result of an inter-system change in 5GMM-CONNECTED mode from N1 mode to S1 mode.

The UE shall deem that the network has failed the authentication check or assume that the authentication is not genuine and proceed as described in item g above if any of the following occurs:

the timer T3520 expires;

the UE detects any combination of the 5G authentication failures: 5GMM causes #20 "MAC failure", #21 "synch failure", #26 "non-5G authentication unacceptable" or #71 "ngKSI already in use", during three consecutive authentication challenges. The 5G authentication challenges shall be considered as consecutive only, if the 5G authentication challenges causing the second and third 5G authentication failure are received by the UE, while the timer T3520 started after the previous 5G authentication failure is running.

For items c, d, e, and f:

Depending on local requirements or operator preference for emergency services, if the UE has an emergency PDU session established or is establishing an emergency PDU session, the AMF need not follow the procedures specified for the authentication failure specified in the present subclause. The AMF may respond to the AUTHENTICATION FAILURE message by initiating the security mode control procedure selecting the "null integrity protection algorithm" 5G-IA0, "null ciphering algorithm" 5G-EA0 or may abort the 5G AKA based primary authentication and key agreement procedure and continue using the current security context, if any. The AMF shall release all non-emergency PDU sessions, if any, by initiating a PDU session release procedure. If there is an ongoing PDU session establishment procedure, the AMF shall release all non-emergency PDU sessions upon completion of the PDU session establishment procedure. The network shall behave as if the UE is registered for emergency services.

If a UE has an emergency PDU session established or is establishing an emergency PDU session and sends an AUTHENTICATION FAILURE message to the AMF with the 5GMM cause appropriate for these cases (#20, #21, #26, or #71 respectively) and receives the SECURITY MODE COMMAND message before the timeout of timer T3520, the UE shall deem that the network has passed the authentication check successfully, stop timer T3520, respectively, and execute the security mode control procedure.

If a UE has an emergency PDU session established or is establishing an emergency PDU session when timer T3520 expires, the UE shall not deem that the network has failed the authentication check and not behave as described in item g. Instead the UE shall continue using the current security context, if any, release all non-emergency PDU sessions, if any, by initiating UE-requested PDU session release procedure. If there is an ongoing PDU session establishment procedure, the UE shall release all non-emergency PDU sessions upon completion of the PDU session establishment procedure. The UE shall start any retransmission timers (e.g. T3510, T3517 or T3521) if:

they were running and stopped when the UE received the AUTHENTICATION REQUEST message and detected an authentication failure;

the procedures associated with these timers have not yet been completed.

The UE shall behave as if the UE is registered for emergency services.

Abbreviations

For the purposes of the present document, the abbreviations given in NPL 1 and the following apply. An abbreviation defined in the present document takes precedence over the definition of the same abbreviation, if any, in NPL 1.

5GC 5G Core Network
5GLAN 5G Local Area Network
5GS 5G System
5G-AN 5G Access Network
5G-AN PDB 5G Access Network Packet Delay Budget
5G-EIR 5G-Equipment Identity Register
5G-GUTI 5G Globally Unique Temporary Identifier
5G-BRG 5G Broadband Residential Gateway
5G-CRG 5G Cable Residential Gateway
5G GM 5G Grand Master
5G-RG 5G Residential Gateway
5G-S-TMSI 5G S-Temporary Mobile Subscription Identifier
5G VN 5G Virtual Network
SQI 5G QoS Identifier
AF Application Function
AKMA Authentication and Key Agreement for Applications
AMF Access and Mobility Management Function
ARPF Authentication credential Repository and Processing Function
AS Access Stratum
ATSSS Access Traffic Steering, Switching, Splitting
ATSSS-LL ATSSS Low-Layer
AUSF Authentication Server Function
AUTN Authentication token
AV Authentication Vector
BMCA Best Master Clock Algorithm
BSF Binding Support Function
CAG Closed Access Group
CAPIF Common API Framework for 3GPP northbound APIs
CHF Charging Function
CN PDB Core Network Packet Delay Budget
CP Control Plane
DAPS Dual Active Protocol Stacks
DL Downlink
DN Data Network
DNAI DN Access Identifier
DNN Data Network Name
DRX Discontinuous Reception
DS-TT Device-side TSN translator
ePDG evolved Packet Data Gateway
EBI EPS Bearer Identity
EUI Extended Unique Identifier
FAR Forwarding Action Rule
FN-BRG Fixed Network Broadband RG
FN-CRG Fixed Network Cable RG
FN-RG Fixed Network RG
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
IAB Integrated access and backhaul
IMEI/TAC IMEI Type Allocation Code
IPUPS Inter PLMN UP Security
I-SMF Intermediate SMF
I-UPF Intermediate UPF
LADN Local Area Data Network
LBO Local Break Out (roaming)
LMF Location Management Function
LoA Level of Automation
LPP LTE Positioning Protocol
LRF Location Retrieval Function
MCX Mission Critical Service
MDBV Maximum Data Burst Volume
MFBR Maximum Flow Bit Rate MICO Mobile Initiated Connection Only
MPS Multimedia Priority Service
MPTCP Multi-Path TCP Protocol
N3IWF Non-3GPP InterWorking Function
NSCW Non-5G-Capable over WLAN
NAI Network Access Identifier
NEF Network Exposure Function
NF Network Function
NGAP Next Generation Application Protocol
NID Network identifier
NPN Non-Public Network
NR New Radio
NRF Network Repository Function
NSI ID Network Slice Instance Identifier
NSSAA Network Slice-Specific Authentication and Authorization
NSSAAF Network Slice-Specific Authentication and Authorization Function
NSSAI Network Slice Selection Assistance Information
NSSF Network Slice Selection Function
NSSP Network Slice Selection Policy
NW-TT Network-side TSN translator
NWDAF Network Data Analytics Function
PCF Policy Control Function
PDB Packet Delay Budget
PDR Packet Detection Rule
PDU Protocol Data Unit
PEI Permanent Equipment Identifier
PER Packet Error Rate
PFD Packet Flow Description
PNI-NPN Public Network Integrated Non-Public Network
PPD Paging Policy Differentiation
PPF Paging Proceed Flag
PPI Paging Policy Indicator
PSA PDU Session Anchor
PTP Precision Time Protocol
QFI QoS Flow Identifier
QoE Quality of Experience
RACS Radio Capabilities Signalling optimization
IAN (Radio) Access Network
RG Residential Gateway
RIM Remote Interference Management
RQA Reflective QoS Attribute
RQI Reflective QoS Indication
RSN Redundancy Sequence Number
SA NR Standalone New Radio
SBA Service Based Architecture
SBI Service Based Interface
SCP Service Communication Proxy
SD Slice Differentiator
SEAF Security Anchor Functionality
SEPP Security Edge Protection Proxy
SMF Session Management Function
SMSF Short Message Service Function
SN Sequence Number
SNPN Stand-alone Non-Public Network
S-NSSAI Single Network Slice Selection Assistance Information
SSC Session and Service Continuity
SSCMSP Session and Service Continuity Mode Selection Policy
SST Slice/Service Type
SUCI Subscription Concealed Identifier
SUPI Subscription Permanent Identifier
SV Software Version
TNAN Trusted Non-3GPP Access Network
TNAP Trusted Non-3GPP Access Point
TNGF Trusted Non-3GPP Gateway Function
TNL Transport Network Layer
TNLA Transport Network Layer Association
TSC Time Sensitive Communication
TSCAI TSC Assistance Information
TSN Time Sensitive Networking
TSN GM TSN Grand Master
TSP Traffic Steering Policy
TT TSN Translator
TWIF Trusted WLAN Interworking Function
UCMF UE radio Capability Management Function
UDM Unified Data Management
UDR Unified Data Repository
UDSF Unstructured Data Storage Function
UL Uplink
UL CL Uplink Classifier
UPF User Plane Function
URLLC Ultra Reliable Low Latency Communication
URRP-AMF UE Reachability Request Parameter for AMF
URSP UE Route Selection Policy
VID VLAN Identifier
VLAN Virtual Local Area Network
W-SGAN Wireline 5G Access Network
W-SGBAN Wireline BBF Access Network
W-SGCAN Wireline 5G Cable Access Network
W-AGF Wireline Access Gateway Function

Definitions

For the purposes of the present document, the terms and definitions given in NPL 1 and the following apply. A term defined in the present document takes precedence over the definition of the same term, if any, in NPL 1.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Indian patent application No. 202011045155, filed on Oct. 16, 2020, the disclosure of which is incorporated herein in its entirety by reference.

REFERENCE SIGNS LIST

1000 UE
1001 antenna
1002 transceiver circuit
1003 user interface
1004 controller
1005 memory
1100 (R)AN node
1101 antenna
1102 transceiver circuit
1103 network interface
1104 controller
1105 memory
1200 AMF
1201 transceiver circuit
1202 controller
1203 memory
1204 network interface

What is claimed is:

1. A method of a User Equipment (UE) which stores a first $K_{AUSF\ (Authentication\ Server\ Function)}$, the method comprising:
in a 5G Authentication and Key Agreement (AKA) based primary authentication and key agreement procedure, receiving, from an Access and Mobility Management Function (AMF), an authentication request message;
computing response information based on the authentication request message;
deriving second $K_{AUSF}$ based on the authentication request message; and
returning, to the AMF, an authentication response message including the response information;
receiving, from the AMF, a Non-Access-Stratum (NAS) message after the 5G AKA based primary authentication and key agreement procedure is successful; and
in a case where the UE receives the NAS message,
deleting the first $K_{AUSF}$,
considering the second $K_{AUSF}$ to be valid $K_{AUSF}$; and
resetting a counter to zero.

2. The method according to claim 1,
wherein the counter is a Steering of Roaming (SoR) counter.

3. The method according to claim 1,
wherein the counter is a UE Parameters Update (UPU) counter.

4. The method according to claim 1, further comprising:
using the second $K_{AUSF}$ in a steering of roaming security mechanism or a UE parameters update via Unified Data Management (UDM) control plane procedure security mechanism.

5. The method according to claim 1,
wherein the first $K_{AUSF}$ is stored in the UE before the 5G AKA based primary authentication and key agreement procedure is initiated.

6. A User Equipment (UE) which stores a first $K_{AUSF\ (Authentication\ Server\ Function)}$, comprising:
at least one memory storing instructions; and
at least one processor configured to execute the instructions to:
receive, in a 5G Authentication and Key Agreement (AKA) based primary authentication and key agreement procedure, from an Access and Mobility Management Function (AMF), an authentication request message;
compute, in the 5G AKA based primary authentication and key agreement procedure, response information based on the authentication request message;
derive, in the 5G AKA based primary authentication and key agreement procedure, second $K_{AUSF}$ based on the authentication request message; and
return, in the 5G AKA based primary authentication and key agreement procedure, to the AMF, an authentication response message including the response information;
receive, from the AMF, a Non-Access-Stratum (NAS) message after the 5G AKA based primary authentication and key agreement procedure is successful; and
in a case where the UE receives the NAS message,
delete the first $K_{AUSF}$;
consider the second $K_{AUSF}$ to be valid $K_{AUSF}$; and
reset a counter to zero.

7. The UE according to claim 6,
wherein the counter is a Steering of Roaming (SoR) counter.

8. The UE according to claim 6,
wherein the counter is a UE Parameters Update (UPU) counter.

9. The UE according to claim 6,
wherein the at least one processor is further configured to execute the instructions to use the second $K_{AUSF}$ in a steering of roaming security mechanism or a UE parameters update via Unified Data Management (UDM) control plane procedure security mechanism.

10. The UE according to claim 6,
wherein the first $K_{AUSF}$ is stored in the UE before the 5G AKA based primary authentication and key agreement procedure is initiated.

* * * * *